(12) United States Patent
Wengreen

(10) Patent No.: US 9,543,082 B1
(45) Date of Patent: Jan. 10, 2017

(54) MOUNTING SYSTEMS FOR REMOTE CONTROLS

(71) Applicant: Innovelis, Inc., Sammamish, WA (US)

(72) Inventor: Eric John Wengreen, Sammamish, WA (US)

(73) Assignee: Innovelis, Inc., Sammamish, WA (US)

( * ) Notice: Subject to any disclaimer, the term of this patent is extended or adjusted under 35 U.S.C. 154(b) by 0 days.

(21) Appl. No.: 15/089,181

(22) Filed: Apr. 1, 2016

Related U.S. Application Data

(63) Continuation-in-part of application No. 29/542,647, filed on Oct. 15, 2015, and a continuation-in-part of application No. 29/542,610, filed on Oct. 15, 2015, and a continuation-in-part of application No. 29/541,839, filed on Oct. 8, 2015, now Pat. No. Des. 763,666.

(60) Provisional application No. 62/243,722, filed on Oct. 20, 2015, provisional application No. 62/252,652, filed on Nov. 9, 2015, provisional application No. 62/245,723, filed on Oct. 23, 2015, provisional application No. 62/242,988, filed on Oct. 16, 2015, provisional application No. 62/242,968, filed on Oct. 16, 2015, provisional application No. 62/241,948, filed on Oct. 15, 2015, provisional application No. 62/239,125, filed on Oct. 8, 2015, provisional application No. 62/234,610, filed on Sep. 29, 2015.

(51) Int. Cl.
| | | |
|---|---|---|
| A47F 5/00 | (2006.01) |
| H01H 9/02 | (2006.01) |
| F16M 13/02 | (2006.01) |
| F16B 47/00 | (2006.01) |
| F16L 3/26 | (2006.01) |
| F16L 3/04 | (2006.01) |

(52) U.S. Cl.
CPC ............ *H01H 9/025* (2013.01); *F16B 47/003* (2013.01); *F16L 3/04* (2013.01); *F16L 3/26* (2013.01); *F16M 13/02* (2013.01)

(58) Field of Classification Search
CPC .. F16M 11/041; G06F 1/1607; B60R 11/0241; H02J 7/0044; H04M 1/04
See application file for complete search history.

(56) References Cited

U.S. PATENT DOCUMENTS

| | | |
|---|---|---|
| 1,618,573 A | 2/1927 | Cole |
| 2,584,646 A | 2/1952 | Wagstaff |
| 3,091,378 A | 5/1963 | O'Dwyer |
| 3,176,950 A | 4/1965 | Hittesdorf |
| 3,279,009 A | 10/1966 | Teasdale |

(Continued)

OTHER PUBLICATIONS

Out of Sight Bracket—Website Part 1 (downloaded on Nov. 13, 2013 from http://www.outofsightbracket.com/OutOfSightBracket/Out_of_Sight_Bracket_for_Apple_TV.html). The website says the Out of Sight Bracket is "Patent Pending." The Out of Sight Bracket might have been made by Gordon H. Beckhart.

(Continued)

*Primary Examiner* — Bradley Duckworth

(57) ABSTRACT

Mounting systems can couple a remote control to a wall, such as a wall of a television. In some embodiments, an adhesive couples the mounting system to the wall. The mounting system can include a clamp configured to secure a cable that charges the remote control. Sliding the remote control into the mounting system can couple the remote control to the cable.

30 Claims, 15 Drawing Sheets

(56) References Cited

U.S. PATENT DOCUMENTS

| | | |
|---|---|---|
| 3,294,298 A | 12/1966 | Danielson |
| 3,477,679 A | 11/1969 | Lovitz |
| 3,990,617 A | 11/1976 | Carter |
| D242,766 S | 12/1976 | Neece |
| 4,067,532 A | 1/1978 | Viteretto |
| 4,158,450 A | 6/1979 | Suzuki |
| 4,467,244 A | 8/1984 | Dickie |
| 4,519,656 A | 5/1985 | Raz |
| D282,034 S | 1/1986 | Janke |
| 4,602,761 A | 7/1986 | Carter |
| 4,697,780 A | 10/1987 | Wenkman |
| 4,746,042 A | 5/1988 | King |
| 4,771,927 A | 9/1988 | Ventura |
| 4,815,683 A | 3/1989 | Ferrante |
| 4,825,590 A | 5/1989 | Cullinane |
| 4,826,115 A | 5/1989 | Novitski |
| 4,840,773 A | 6/1989 | Wade |
| 4,852,843 A | 8/1989 | Chandler |
| 4,974,764 A | 12/1990 | Cantwell |
| D317,157 S | 5/1991 | Jondelius |
| 5,038,985 A | 8/1991 | Chapin |
| 5,092,395 A | 3/1992 | Amidzich |
| 5,227,582 A | 7/1993 | Velasco et al. |
| 5,273,690 A | 12/1993 | McDowell |
| 5,297,318 A | 3/1994 | Adolphson |
| D351,341 S | 10/1994 | Hung |
| 5,385,282 A | 1/1995 | Chen |
| 5,400,990 A | 3/1995 | Frankel |
| D359,616 S | 6/1995 | Ishibashi |
| D361,335 S | 8/1995 | Rudkiewicz |
| 5,535,093 A | 7/1996 | Noguchi |
| D376,787 S | 12/1996 | Calfee |
| 5,593,124 A | 1/1997 | Wang |
| 5,619,395 A | 4/1997 | McBride |
| 5,619,774 A | 4/1997 | Perry |
| D388,107 S | 12/1997 | Huckins |
| D390,849 S | 2/1998 | Richter |
| 5,850,998 A | 12/1998 | Parsey |
| D407,408 S | 3/1999 | Hoff |
| D409,079 S | 5/1999 | Sobczynski |
| 5,899,371 A | 5/1999 | Weliver |
| D411,542 S | 6/1999 | Richter |
| 5,914,707 A | 6/1999 | Kono |
| 5,961,083 A | 10/1999 | Hartmann |
| 5,979,724 A | 11/1999 | Loewenthal |
| D420,149 S | 2/2000 | Hersh |
| 6,039,173 A | 3/2000 | Crow |
| 6,102,660 A | 8/2000 | Lee |
| 6,105,923 A | 8/2000 | Robertson |
| D431,250 S | 9/2000 | Richter |
| 6,163,997 A | 12/2000 | Deralas |
| 6,193,546 B1 | 2/2001 | Sadler |
| D443,493 S | 6/2001 | Skeem |
| 6,275,885 B1 | 8/2001 | Chin |
| 6,336,615 B1 | 1/2002 | Jeon |
| D456,024 S | 4/2002 | Richter |
| D456,413 S | 4/2002 | Malson |
| 6,445,290 B1 * | 9/2002 | Fingal ............... G08B 21/24 |
| | | 340/12.54 |
| 6,485,144 B1 | 11/2002 | Liao |
| D471,547 S | 3/2003 | Ruohonen |
| 6,554,527 B1 | 4/2003 | O'Donnell |
| 6,560,983 B1 | 5/2003 | Schimmeyer |
| 6,691,374 B2 | 2/2004 | Coyne |
| 6,888,940 B1 | 5/2005 | Deppen |
| D508,605 S | 8/2005 | Hwang et al. |
| 6,939,641 B2 | 9/2005 | Kincaid |
| 6,983,126 B1 * | 1/2006 | Saalman ............... H04N 5/60 |
| | | 341/176 |
| 7,047,601 B1 | 5/2006 | Vernon-Woods |
| 7,067,737 B2 * | 6/2006 | Mallen ............... H02G 3/14 |
| | | 174/66 |
| 7,079,384 B2 | 7/2006 | Wang |
| 7,080,764 B2 | 7/2006 | McNicholas |
| 7,113,218 B2 | 9/2006 | Battles |
| D529,713 S | 10/2006 | Guyot |
| D529,905 S | 10/2006 | Richter |
| D530,713 S | 10/2006 | Richter |
| D533,175 S | 12/2006 | Richter |
| 7,145,603 B2 | 12/2006 | Whitby |
| D535,826 S | 1/2007 | Toghanian |
| D536,239 S | 2/2007 | Tallman |
| 7,222,762 B2 | 5/2007 | Rees |
| D545,343 S | 6/2007 | Braun |
| D551,008 S * | 9/2007 | Hidalgo ............... D6/567 |
| D553,352 S | 10/2007 | Allen |
| D557,266 S | 12/2007 | Hughes |
| D560,411 S | 1/2008 | Chung |
| D564,529 S | 3/2008 | Hughes |
| D565,399 S | 4/2008 | Grey |
| D568,889 S | 5/2008 | Hughes |
| 7,367,089 B2 | 5/2008 | Cooke |
| D570,801 S | 6/2008 | Allen |
| D586,795 S | 2/2009 | Richter |
| D598,945 S | 8/2009 | Gillespie |
| 7,580,255 B2 | 8/2009 | Crooijmans |
| D601,000 S | 9/2009 | Cole |
| D609,030 S | 2/2010 | Barabas |
| D624,949 S | 10/2010 | Nakayama |
| D625,729 S | 10/2010 | McNames |
| D628,611 S | 12/2010 | Lewis |
| 7,854,420 B2 | 12/2010 | Depay |
| D633,503 S | 3/2011 | Bo |
| 7,959,121 B1 | 6/2011 | Barnes |
| 7,980,435 B2 | 7/2011 | Tages |
| D648,727 S | 11/2011 | Van Den Nieuwenhuizen |
| D657,362 S | 4/2012 | Lister |
| D662,491 S | 6/2012 | Andre |
| D667,411 S | 9/2012 | Kim |
| D672,308 S | 12/2012 | Cobbett |
| 8,322,584 B2 | 12/2012 | Dethmers |
| 8,544,805 B2 | 10/2013 | Virgin |
| D695,748 S | 12/2013 | Morris |
| D700,832 S | 3/2014 | Ng |
| D705,229 S | 5/2014 | Wengreen |
| D710,340 S | 8/2014 | Wengreen |
| D712,906 S | 9/2014 | Wengreen |
| D713,399 S | 9/2014 | Green |
| 8,847,549 B2 * | 9/2014 | Graham ............... H02J 7/0044 |
| | | 310/50 |
| 8,848,113 B2 | 9/2014 | Wengreen |
| D714,793 S | 10/2014 | Kim |
| D716,580 S | 11/2014 | Wengreen |
| 8,896,768 B1 | 11/2014 | Wengreen |
| 8,934,060 B1 | 1/2015 | Wengreen |
| 8,934,061 B1 | 1/2015 | Wengreen |
| 8,939,417 B1 | 1/2015 | Wengreen |
| D723,042 S | 2/2015 | Lee |
| 8,988,616 B2 | 3/2015 | Wengreen et al. |
| D729,544 S * | 5/2015 | Wengreen ............... D6/567 |
| D732,939 S | 6/2015 | Cannaverde |
| D733,542 S | 7/2015 | Cannaverde |
| D734,305 S | 7/2015 | Wengreen |
| D735,174 S | 7/2015 | Wengreen |
| 9,131,195 B2 | 9/2015 | Wengreen |
| D749,549 S | 2/2016 | Wengreen |
| D752,415 S | 3/2016 | Lu |
| 9,339,112 B2 | 5/2016 | Wengreen |
| 2005/0023419 A1 | 2/2005 | Frankel |
| 2005/0211861 A1 | 9/2005 | Lee |
| 2005/0236541 A1 | 10/2005 | Chang |
| 2006/0224575 A1 | 10/2006 | Ostojic |
| 2007/0097617 A1 | 5/2007 | Searby |
| 2007/0235609 A1 | 10/2007 | Chun |
| 2007/0264169 A1 | 11/2007 | Chen |
| 2008/0078793 A1 | 4/2008 | Brown |
| 2009/0218454 A1 | 9/2009 | Stanley |
| 2009/0296997 A1 | 12/2009 | Rocheford |
| 2010/0270190 A1 * | 10/2010 | Howard ............... H04N 5/64 |
| | | 206/320 |
| 2010/0281671 A1 | 11/2010 | De Vaan |
| 2010/0288895 A1 | 11/2010 | Shamie |
| 2010/0314277 A1 | 12/2010 | Murray |
| 2011/0242439 A1 | 10/2011 | Calderon |

(56) References Cited

U.S. PATENT DOCUMENTS

| | | | |
|---|---|---|---|
| 2012/0126081 A1 | 5/2012 | Wengreen | |
| 2012/0127379 A1 | 5/2012 | Wengreen | |
| 2012/0168516 A1 | 7/2012 | Bolger | |
| 2012/0280014 A1* | 11/2012 | Lopez-Apodaca | B60R 11/0241 224/539 |
| 2012/0312950 A1 | 12/2012 | Sears | |
| 2014/0061406 A1 | 3/2014 | Chevalier | |
| 2014/0103179 A1* | 4/2014 | Lipke | H02G 3/14 248/231.91 |
| 2015/0070835 A1* | 3/2015 | Mclean | G06F 1/1632 361/679.41 |
| 2015/0212544 A1* | 7/2015 | Chen | G06F 1/1632 361/679.41 |
| 2015/0305502 A1 | 10/2015 | Wengreen | |
| 2016/0007735 A1* | 1/2016 | Gallup | A44B 11/2592 248/447.1 |
| 2016/0119458 A1* | 4/2016 | Gunther | F16B 2/10 248/316.5 |
| 2016/0120295 A1* | 5/2016 | Rowley | A45F 5/00 248/346.06 |
| 2016/0218535 A1* | 7/2016 | Prete | H02J 7/0044 |
| 2016/0241289 A1* | 8/2016 | Wieth | B62B 3/1428 |

OTHER PUBLICATIONS

Out of Sight Bracket—Website Part 2 (downloaded on Nov. 13, 2013 from http://www.outofsightbracket.com/OutOfSightBracket/How_to_mount_your_Apple_TV_or_AirPort_Express.html).
The website says the Out of Sight Bracket is "Patent Pending." The Out of Sight Bracket might have been made by Gordon H. Beckhart.
Out of Sight Bracket—Website Part 3 (downloaded on Nov. 13, 2013 from http://www.soundandvision.com/ content/bracket-keeps-apple-airport-express-and-apple-tv-out-sight).
TV Tray—Website (downloaded on Nov. 13, 2013 from http://h-sq.com/products/tvtray/).
TV Tray—Installation Guide (downloaded on Nov. 13, 2013 from http://www.h-sq.com/downloads/tvtx_ug.pdf).
Cosmos Tray—Website (downloaded on Nov. 13, 2013 from http://www.amazon.com/Cosmos-MD199LL-AirPort-Express-Station/dp/B00C2JNGB2/ref=sr_1_4?ie=UTF8&qid=1384406376&sr=8-4&keywords=apple+tv+mount).
CTA Digital—Website (downloaded on Nov. 13, 2013 from http://www.ctadigital.com/downloads/KIN-WMC-final.pdf).
PDP Mounting Clip—Part 1 (downloaded on Nov. 13, 2013 from http://www.amazon.com/Kinect-Sensor-TV-Mounting-Clip-Xbox/dp/B004XV6ST4).
PDP Mounting Clip—Part 2 (downloaded on Nov. 13, 2013 from http://www.microsoftstore.com/store/msusa/en_US/pdp/Kinect-Sensor-TV-Mounting-Clip/productID.253726200).
PDP Mounting Clip—Part 3 (downloaded on Nov. 13, 2013 from http://www.bestbuy.com/site/pdp-sensor-mounting-clip-for-kinect/3521258.p?id=1218408957863&skuId=3521258).
ScreenDeck (downloaded on Nov. 13, 2013 from http://news.cnet.com/8301-17938_105-20071226-1/screendeck-adds-top-shelf-to-your-flat-panel-tv/).
Center Stage Bracket—Part 1 (downloaded on Nov. 13, 2013 from http://www.bestbuy.com/site/center-stage-bracket-satellite-center-channel-speaker-shelf-bracket-black/5857191.p?id=1218697292805&skuId=5857191).
Center Stage Bracket—Part 2 (downloaded on Nov. 13, 2013 from http://www.bestbuy.com/site/center-stage-bracket-satellite-center-channel-speaker-shelf-bracket-black/5857191.p?id=1218697292805&skuId=5857191).
DreamGear TriMount (downloaded on Nov. 14, 2013 from http://www.dreamgear.net/shop-by-platform/universal/trimount.html).
Cisco router wall mounting instructions (downloaded on Jan. 2, 2014 from http://www.cisco.com/en/US/docs/routers/access/1800/1841/hardware/installation/guide/18inst.pdf).
Cisco wall mounting bracket (downloaded on Jan. 2, 2014 from http://www.cisco.com/en/US/docs/routers/access/800/806/hardware/installation/guidef/install.pdf).
Netgear ProSafe (downloaded on Jan. 2, 2014 from http://www.storagereview.com/ netgear_prosafe_wndap660_dualband_wireless_access_point_review) article includes a date of Dec. 21, 2012.
Wireless router picture (downloaded on Jan. 2, 2014 from http://www.techwarelabs.com/wp-content/gallery/ engenius-esr9850-wireless-router/router-bottom.jpg).
Apple TV, downloaded on Feb. 3, 2014 from http://www.apple.com/appletv/what-is/.
Roku media players—Part 1, downloaded on Feb. 3, 2014 from http://www.roku.com/products/roku-2.
Roku media players—Part 2, downloaded on Feb. 3, 2014 from http://www.roku.com/products/compare.
Innovelis, Inc. Product—TotalMount—Apple TV Mounting Kit, downloaded from Amazon.com on Feb. 3, 2014, first available on Amazon.com on Jun. 22, 2011: http://www.amazon.com/TotalMount-Apple-Universal-Mounting-Kit/dp/B0057CVH6W/ref=sr_1_1?ie=UTF8&qid=1391473446&sr=8-1&keywords=TOTALMOUNT.
Innovelis, Inc. Product—TotalMount—Roku Mounting Kit, downloaded from Amazon.com on Feb. 3, 2014, first available on Amazon.com on Jun. 14, 2012: http://www.amazon.com/TotalMount-ROKU-UNIVERSAL-MOUNTING-Compatible/dp/B008B1125W/ref=sr_1_2?ie=UTF8&qid=1391473922&sr=8-2&keywords=totalmount.
Innovelis, Inc. Product—TotalMount—Remote Holder, downloaded from Amazon.com on Feb. 3, 2014, first available on Amazon.com on Jul. 2, 2013: http://www.amazon.com/Apple-TV-Remote-Holder-TotalMount/dp/B00DR76YJO/ref=sr_1_3?ie=UTF8&qid=1391474218&sr=8-3&keywords=totalmount.
Innovelis, Inc. Product—TotalMount—AirPort Express Mounting Kit, downloaded from Amazon.com on Feb. 3, 2014, first available on Amazon.com in approximately Sep. 2012: http://www.amazon.com/TotalMount-AirPort- Express-Mounting-Kit/dp/B009HC7BL8/ref=sr_1_4?ie=UTF8&qid=1391474218&sr=8-4&keywords=totalmount.
Innovelis, Inc. Product—TotalMount—Roku Mounting Kit (Version 1), downloaded from Amazon.com on Feb. 3, 2014, first available on Amazon.com on Jan. 19, 2012: http://www.amazon.com/TotalMount-ROKU-MOUNTING- Compatible-Roku/dp/B006ZS4R46/ref=sr_1_5?ie=UTF8&qid=1391474218&sr=8-5&keywords=totalmount.
Innovelis, Inc. Product—TotalMount—AirPort Extreme Mounting Kit, downloaded from Amazon.com on Feb. 3, 2014, first available on Amazon.com in approximately Apr. 2013: http://www.amazon.com/TotalMount-Compatible-generations-compatible-generation/dp/B00CK2CDLK/ref=sr_1_7e?ie=UTF8&qid=1391474218&sr=8-7&keywords=totalmount.
Innovelis, Inc. Product—TotalMount—Vizio Mounting Kit, downloaded from Amazon.com on Feb. 3, 2014, first available on Amazon.com in approximately May 2013: http://www.amazon.com/TotalMount-VIZIO-Co-Star-Mounting-Kit/dp/B00GDMXSZ8/ref=sr_1_10?ie=UTF8&qid=1391474218&sr=8-10&keywords=totalmount.
Innovelis, Inc. Product—TotalMount—Amazon Fire TV Mounting System, downloaded from Amazon.com on Mar. 7, 2016, first available on Amazon.com in approximately Jul. 2014 http://www.amazon.com/TotalMount-VIZIO-Co-Star-Mounting-Kit/dp/B00GDMXSZ8/ref=sr_1_10?ie=UTF8&qid=1391474218&sr=8-10&keywords=totalmount.
Amazon Fire TV, downloaded on Jun. 2, 2014 from http://www.amazon.com/Fire-TV-streaming-media-player/dp/B00CX5P8FC.
Logitech HD Pro Webcam C910, downloaded on Oct. 9, 2014 from http://www.amazon.com/Logitech-Webcam-C910-1080p-Video/dp/B003M2YT96/ref=sr_1_6?ie=UTF8&qid=1287528024&sr=8-6.
HP KQ246AA 8.0 MP Deluxe Webcam, downloaded on Oct. 9, 2014 from http://www.amazon.com/HP-KQ246AA-8-0-Deluxe-Webcam/dp/B001D8AGA2/ref=sr_1_4?ie=UTF8&qid=1410543707&sr=8-4&keywords=hp+webcam.

(56) References Cited

OTHER PUBLICATIONS

Logitech Webcam C200, downloaded on Oct. 9, 2014 from http://www.amazon.com/Logitech-960-000415-Webcam-C200/dp/B002GP7ZTQ/ref=pd_cp_pc_0.
USB 6 LED PC Webcam, downloaded on Oct. 9, 2014 from http://www.amazon.com/Webcam-Camera-Night-Vision-Meeting/dp/B00MTGV4F8/ref=sr_1_88?s=electronics&ie=UTF8&qid=1410543946&sr=1-88&keywords=webcam+clamp.
Twelve South—HiRise Owner's Guide (showing additional details regarding the product shown in U.S. Pat. No. D. 713,399), available at least as early as Aug. 8, 2013.

\* cited by examiner

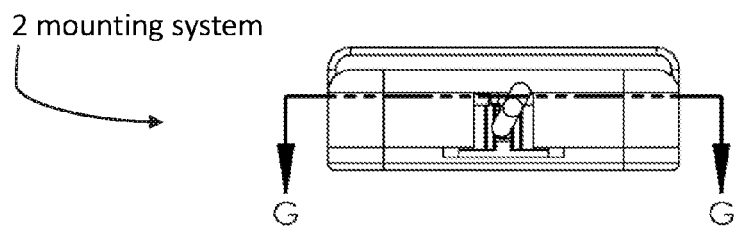
Figure 13
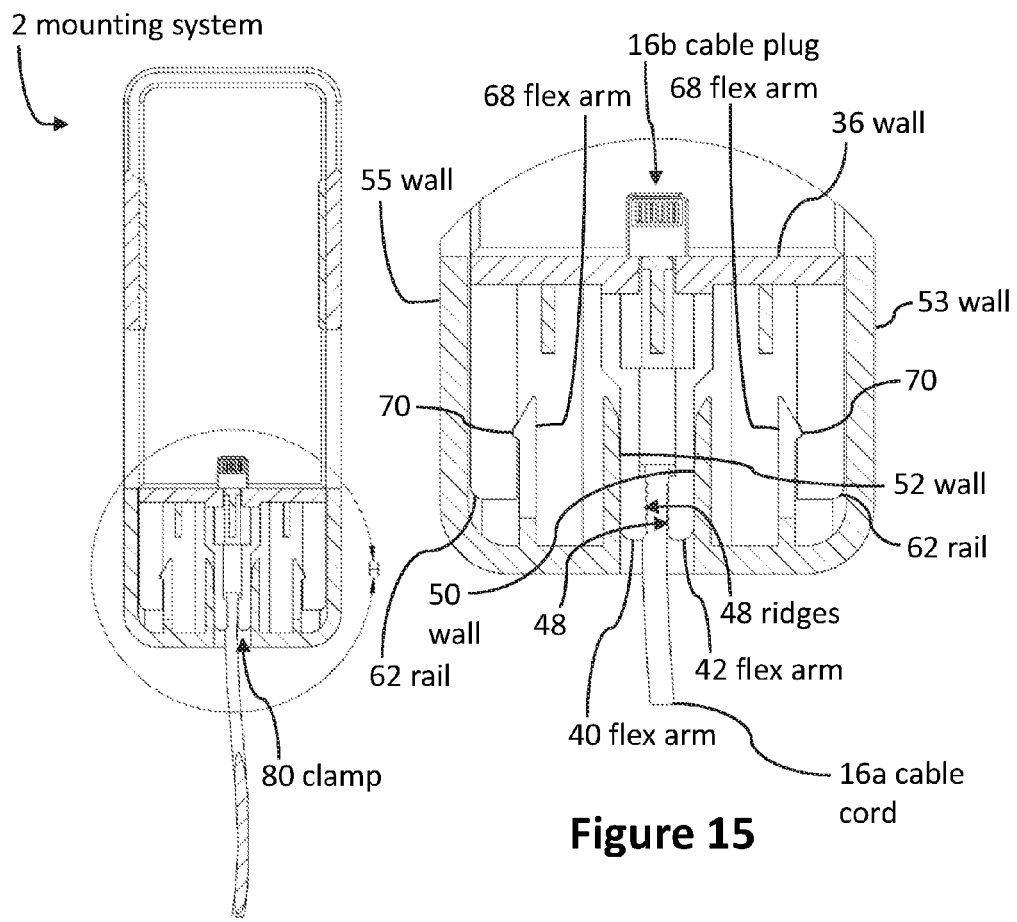
Figure 14
Figure 15

MOUNTING SYSTEMS FOR REMOTE CONTROLS

CROSS-REFERENCE TO RELATED APPLICATIONS

The entire contents of the following application are incorporated by reference herein: U.S. Provisional Patent Application No. 62/243,722; filed Oct. 20, 2015; and entitled MOUNTING SYSTEMS FOR DIGITAL MEDIA PLAYERS.

The entire contents of the following application are incorporated by reference herein: U.S. Design patent application No. 29/542,647; filed Oct. 15, 2015; and entitled MOUNT FOR ELECTRONIC DEVICES.

The entire contents of the following application are incorporated by reference herein: U.S. Provisional Patent Application No. 62/252,652; filed Nov. 9, 2015; and entitled MOUNTING SYSTEMS AND KITS FOR DIGITAL MEDIA PLAYERS.

The entire contents of the following application are incorporated by reference herein: U.S. Provisional Patent Application No. 62/245,723; filed Oct. 23, 2015; and entitled MOUNTING SYSTEMS FOR ELECTRICAL CABLES.

The entire contents of the following application are incorporated by reference herein: U.S. Provisional Patent Application No. 62/242,988; filed Oct. 16, 2015; and entitled MOUNTING SYSTEMS FOR REMOTE CONTROLS.

The entire contents of the following application are incorporated by reference herein: U.S. Provisional Patent Application No. 62/242,968; filed Oct. 16, 2015; and entitled MOUNTING SYSTEMS FOR DIGITAL MEDIA PLAYERS.

The entire contents of the following application are incorporated by reference herein: U.S. Provisional Patent Application No. 62/241,948; filed Oct. 15, 2015; and entitled MOUNTING SYSTEMS FOR DIGITAL MEDIA PLAYERS.

The entire contents of the following application are incorporated by reference herein: U.S. Provisional Patent Application No. 62/239,125; filed Oct. 8, 2015; and entitled MOUNTING SYSTEMS FOR DIGITAL MEDIA PLAYERS.

The entire contents of the following application are incorporated by reference herein: U.S. Provisional Patent Application No. 62/234,610; filed Sep. 29, 2015; and entitled MOUNTING SYSTEMS FOR DIGITAL MEDIA PLAYERS.

The entire contents of the following application are incorporated by reference herein: U.S. Design patent application No. 29/542,610; filed Oct. 15, 2015; and entitled MOUNT FOR ELECTRONIC DEVICES.

The entire contents of the following application are incorporated by reference herein: U.S. Design patent application No. 29/541,839; filed Oct. 8, 2015; and entitled CABLE HOLDER.

The entire contents of the following application are incorporated by reference herein: U.S. Nonprovisional patent application Ser. No. 14/169,148; filed Jan. 30, 2014; and entitled MOUNTING METHODS FOR DIGITAL MEDIA PLAYERS.

The entire contents of the following patent are incorporated by reference herein: U.S. Pat. No. D716,580; issued Nov. 4, 2014; and entitled REMOTE CONTROL HOLDER.

The entire contents of the following application are incorporated by reference herein: U.S. Design patent application No. 29/514,250; filed Jan. 9, 2015; and entitled MOUNT FOR ELECTRONIC DEVICES.

The entire contents of the following application are incorporated by reference herein: U.S. Design patent application No. 29/522,576; filed Mar. 31, 2015; and entitled MOUNT FOR ELECTRONIC DEVICES.

BACKGROUND

Field

Various embodiments disclosed herein relate to mounting systems and mounting methods. Certain embodiments relate to mounting systems for electronic devices such as remote controls.

Description of Related Art

Mounting systems can be used to couple electronic devices such as remote controls to a wall. There is a need for systems and methods to reliably mount electronic devices to diverse types of walls and surfaces.

SUMMARY

Mounting systems can be used to couple electronic devices to a wall, such as a wall of a building or a wall of a television. In some embodiments, mounting systems couple electronic devices to a side (e.g., a backside) of a television such that a portion of the mounting system is located between the backside of the television and an electronic device such as a remote control.

The disclosure includes a mounting system configurable to couple a remote control to a television. In some embodiments, the mounting system includes a base, wherein an adhesive is coupled to the backside of the base and faces inward away from the base; a first wall and a second wall that are coupled to an upper portion of the base and protrude outward away from the base, wherein the mounting system is configured to hold at least a portion of the remote control between the first and second sidewalls; and a channel coupled to a lower portion of the base and configured to hold a cable plug such that a cable cord exits the lower portion of the base.

As well, in some embodiments, the mounting system further includes a third wall that protrudes outward from the base and that separates the upper portion from the lower portion. The channel can pass through at least a portion of the third wall. The third wall can be oriented within ten degrees of perpendicular relative to the first wall and the second wall.

Even still, in some embodiments, the mounting system further includes a first flex arm and a fourth wall coupled to the lower portion such that a cable retention area is located between the first flex arm and the fourth wall. The first flex arm can be configured to move towards the fourth wall to compress the cable cord to impede the cable cord from moving relative to the base. The cable retention area can be aligned with a central axis of the channel.

In some embodiments, the mounting system further includes a fifth wall and a sixth wall that are movable relative to the first flex arm and the fourth wall. The first flex arm and the fourth wall can thereby be located at least partially between the fifth wall and the sixth wall such that moving fifth wall and the sixth wall until the cable retention area is located between the fifth wall and the sixth wall compresses the cable by moving the first flex arm towards the fourth wall.

As well, in some embodiments, the mounting system further includes a second flex arm comprising the fourth wall, wherein the second flex arm is configured to bend towards the first flex arm. Even still, in some embodiments, the mounting system further includes a cover having the fifth wall and the sixth wall, wherein the cover slides towards the third wall to mate with the base and to press the first flex arm towards the fourth wall to compress the cable cord. The cover can comprise a first rail that couples with a second rail of the base to secure the cover to the base. As well, the cover can comprise a third flex arm having a protrusion that mates with an indentation of the second rail to secure the cover to the base.

Even still, in some embodiments, a first portion of the fifth wall and a second portion of the sixth wall form a funnel having a wide end and a narrow end, wherein the wide end is located closer to the third wall than the narrow end such that the funnel is configured to facilitate compressing the first flex arm towards the fourth wall. In some embodiments, a top portion of the cover comprises a protrusion that extends away from the cover, wherein the protrusion is configured to mate with the cable plug to secure the cable plug in place relative to the cover. The protrusion can comprise a vertical extending portion and a horizontal extending portion to thereby define a t-shape.

In some embodiments, the first flex arm protrudes downward away from the first and second walls. As well, in some embodiments, a distal portion of the first flex arm comprises a first plurality of cable retention ridges that protrude towards the fourth wall. The first plurality of cable retention ridges can be elongate along a first direction that extends substantially perpendicular to the base. The first plurality of cable retention ridges can protrude along a second direction that is substantially perpendicular to the first direction. Even still, in some embodiments, a distal portion of the fourth wall comprises a second plurality of cable retention ridges that protrude towards the first flex arm.

In some embodiments, the first flex arm is located on an opposite side of the base relative to the adhesive, the adhesive couples the base to the television, and the mounting system holds the remote control. As well, in some embodiments, the first flex arm couples the cable cord to the base, the cable plug is located at least partially in the channel, and the cable plug is located at least partially inside a receptacle of the remote control.

As well, in some embodiments, the mounting system further comprises an open area between the first and second walls and the third wall. The open area can be configured to enable a user to see a distal portion of the cable plug to facilitate guiding a receptacle of the remote control to mate with the cable plug.

Even still, in some embodiments, the mounting system can further include an outer wall that couples the first wall to the second wall. The first and second walls can couple the outer wall to the base. A perimeter formed by the outer wall, the first wall, the second wall, and the base and configured to wrap around a portion of the remote control can be formed by a softer material than a first material used to form the base.

In some embodiments, the channel faces upwards and comprises a notch configured to enable placing the cable cord inside the channel. As well, in some embodiments, the mounting system further comprises a first flex arm and a fourth wall coupled to the channel and protruding downward away from the channel to form a cable retention area.

Even still, in some embodiments, adhesive couples the base to a backside of the television while the channel couples the cable plug to the lower portion of the base. In some embodiments, the mounting system further includes a clamp that compresses the cable cord within an interior portion of the mounting system. The clamp can be coupled to the lower portion of the base such that the channel orients the cable cord downward relative to the television.

As well, in some embodiments, the channel is coupled to the lower portion such that a majority of the adhesive coupled to the backside of the base is located higher than the channel such that pressing the remote control onto the cable plug places at least 60 percent of the adhesive in vertical tension rather than in vertical compression. In some embodiments, a first portion of the adhesive is located between the channel and the television.

Furthermore, in some embodiments, the mounting system further comprises a third wall that protrudes outward from the base and that separates the upper portion from the lower portion. The channel can pass through at least a portion of the third wall. The remote can be located above the third wall. The channel can be located below the third wall such that the base extends farther downward relative to the television than the remote control. The third wall can be configured to prevent the remote control from moving farther downward than the third wall.

As well, the disclosure includes a mounting system configurable to couple a remote control to a wall. In some embodiments, the mounting system includes a base having a first sidewall and a second sidewall configured to wrap at least partially around the remote control, wherein a first flex arm is coupled to the base, and the first flex arm extends away from the first sidewall and the second sidewall; an adhesive coupled to a backside of the base and configured to couple the base to the wall; and a cable secured to the base by the first flex arm.

In some embodiments, the adhesive is located on an opposite side relative to the first sidewall and the second sidewall. The adhesive can couple the mounting system to the wall while the base holds the remote control and while the first flex arm secures the cable such that the cable is coupled with the remote control.

As well, in some embodiments, the mounting system further includes a cover that slides towards the first sidewall and the second sidewall to mate with the base and to press the first flex arm towards a first barrier to compress the cable. Even still, in some embodiments, the cover comprises a second barrier and a third barrier that compress the first flex arm towards the first barrier. The first barrier can comprise a second flex arm. As well, in some embodiments of the mounting system, a first portion of the second barrier and a second portion of the third barrier form a funnel configured to facilitate compressing the first flex arm towards the first barrier. In some embodiments, the first barrier comprises a fourth wall and/or a second flex arm.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

FIG. 13 illustrates a bottom view of an embodiment of a mounting system, according to some embodiments.

FIG. 14 illustrates a cross-sectional view along line G-G from FIG. 13, according to some embodiments.

FIG. 15 illustrates a front view of area H from FIG. 14, according to some embodiments.

DETAILED DESCRIPTION

Figure 1:
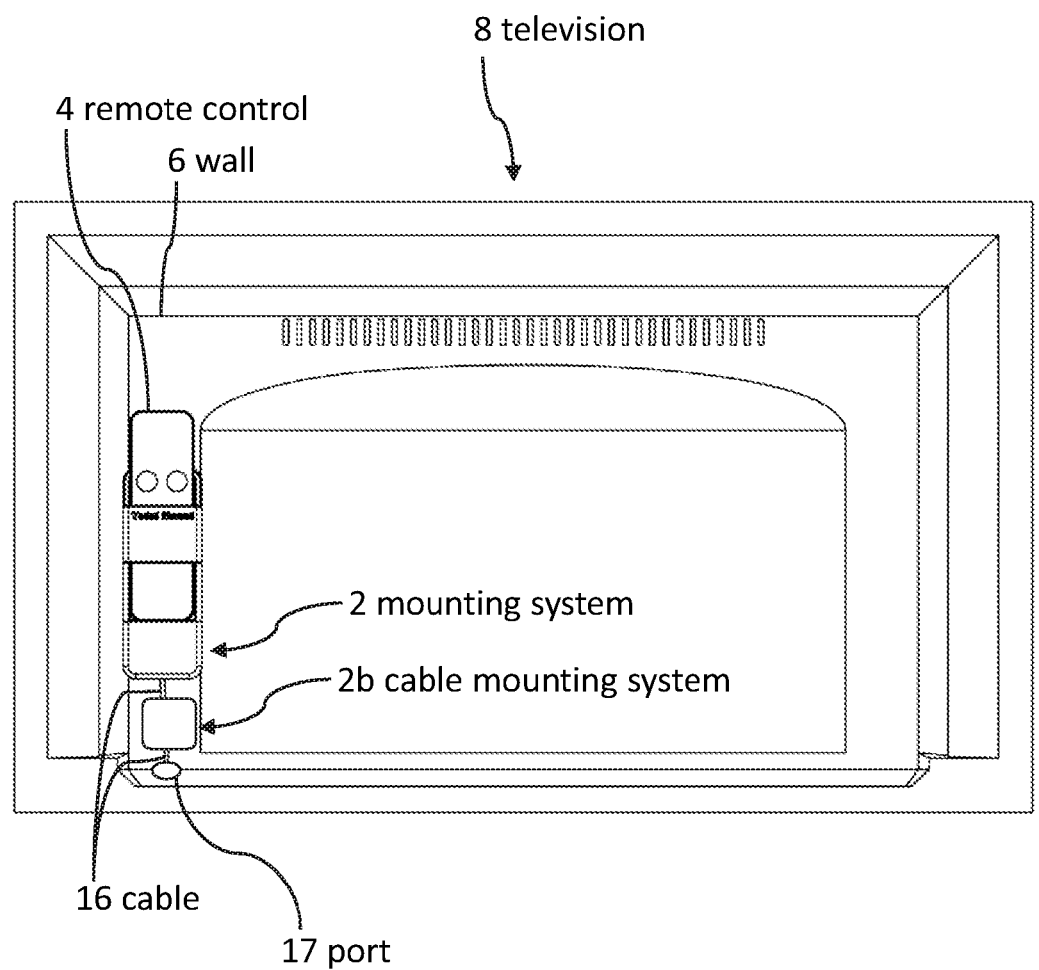
FIG. 1 illustrates a front view of an embodiment of a system, according to some embodiments.
Figure 2:
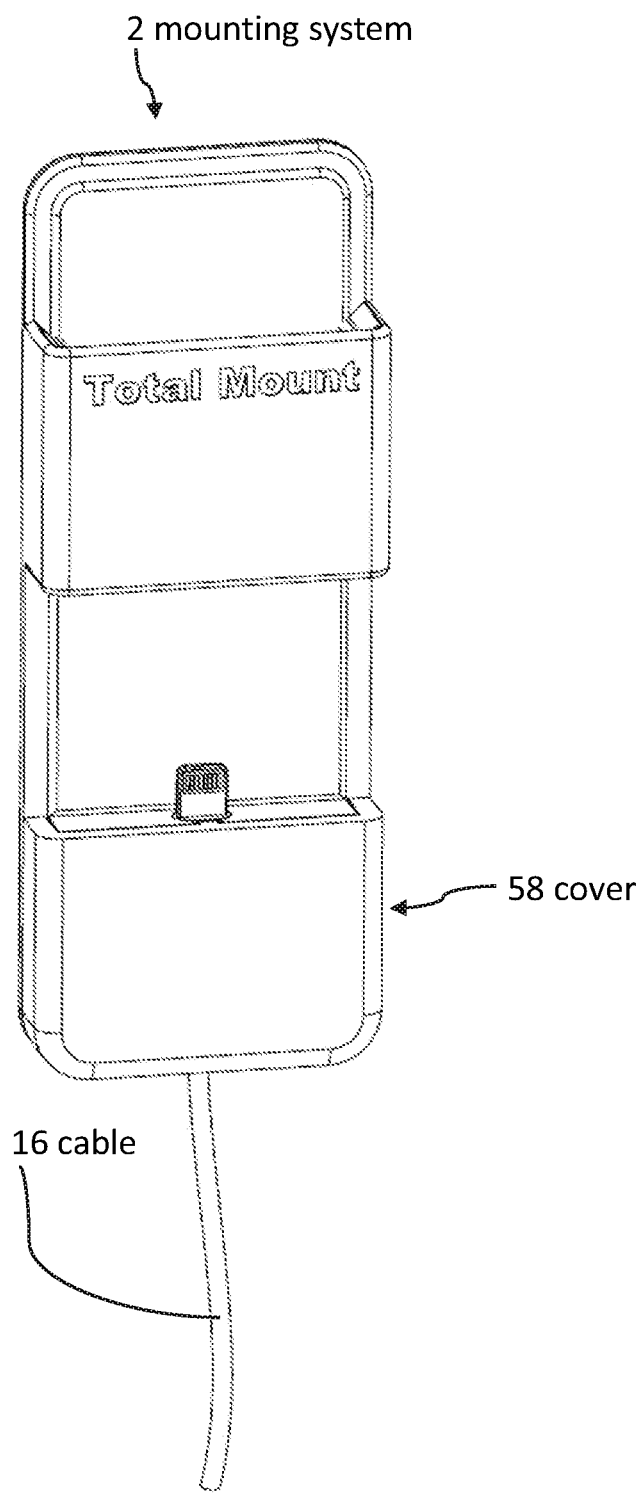
FIG. 2 illustrates a perspective view of an embodiment of a mounting system, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Electronic devices include many types of devices that send content (e.g., movies, TV shows) to televisions. Electronic devices can include Digital Video Disc (DVD) players, Blu-ray players, digital media extenders, and digital media players such as Apple TV (made by Apple, Inc.), Roku players (made by Roku, Inc.), and Amazon Fire TV (made by Amazon.com, Inc.).

Digital media players often transmit digital signals wirelessly or through a wire such as a High-Definition Multimedia Interface (HDMI) cable to a screen that displays an image based on the digital signal. Screens include computer monitors, televisions, and image-producing portions of movie projectors. Televisions include flat-panel displays, flat-screen televisions, and tube televisions.

Owners of digital media players may prefer to mount their digital media players near their screens. For example, a person who owns a flat screen television that is mounted on the wall might want to mount her Apple TV onto her flat screen television or onto the wall behind her flat screen television. Some embodiments described herein enable people to mount their digital media players to their televisions (e.g., to a backside of a television).

Digital media players can be controlled by remote controls. Remote controls can use wireless communication systems (e.g., infrared, Bluetooth) to send signals to the digital media players. Remote controls are often lost, which can be frustrating to users. For example, remote controls can slip between couch cushions for be carried to another room and then forgotten. Mounting systems for remote controls can reduce the likelihood of remote controls being lost by providing a secure and consistent location to store a remote control.

Some mounting systems for remote controls couple to a television. For example, the mount system can adhere to the left side, right side, or backside of the television.

The mounting systems can be coupled to walls (e.g., a wall of an electronic display such as a television) via adhesive, such as adhesive pads made by 3M Company, which has offices in St. Paul, Minn.

The mounting systems can be molded from acrylonitrile butadiene styrene ("ABS"). In some embodiments, surfaces of the mounting systems that may touch portions of the media player are overmolded with a softer material, which can be a thermoplastic elastomer ("TPE") or thermoplastic polyurethane ("TPU").

Lightning is a proprietary computer bus and power connector created by Apple Inc. "HDMI" (High-Definition Multimedia Interface) is a proprietary audio/video interface for transferring video data and audio data. "USB" (Universal Serial Bus) is an industry standard for some types of cables, connectors, and communications protocols used in a bus for communication and power supply between electronic devices.

Cables often include a cable cord and a cable plug. A cable plug can be coupled to an end of a cable cord to enable a person to "plug in" the cable (e.g., connect the cable cord to an electrical receptacle such as a Lightning port, an HDMI port, a USB port, or an electrical outlet). The electrical receptacle can be a charging port of a remote control (although there are many other types of electrical receptacles used in many embodiments).

As used herein, a "cable cord" is one wire or a group of wires, glass fibers, etc., covered by insulation (e.g., plastic or rubber) and used to carry electricity or electrical signals. As used herein, a "cable plug" is an end portion that can be used to electrically couple the cable cord to an electrical receptacle.

Index

This index provides general information that is applicable to most embodiments. Some embodiments use different numbers and/or descriptions than shown in this index.
2—Mounting system
4—Remote control
6—Wall
8—Television
12—Adhesive
14—Base
16—Cable
16a—Cable cord
16b—Cable plug
17—Electrical port
20—Channel
24—Upper portion
26—Lower portion
30—Wall
32—Wall
34—Outside wall
36—Wall
40—Flex arm (first flex arm)
42—Fourth wall (or second flex arm)
46—Cable retention area
48—Cable retention ridges
50—Wall
52—Wall
53—Wall
55—Wall
58—Cover
60—Rail (first rail)
62—Rail (second rail)
66—Indentation
67—Outward layer
68—Flex arm (third flex arm)
70—Protrusion
72—Funnel
74—Open area
76—Notch
80—Clamp
90—Softer material
92—First material
94—Ramp
95—Open area between ramps
96—Receptacle
98—Forward stop Mounting Systems The disclosure includes a mounting system 2 configurable to couple a remote control 4 to a television 8 (e.g., such that the cable 16 is electrically coupled to an electrical port 17 of the television 8 as shown in FIG. 1). In some embodiments, the mounting system 2 includes a base 14 and an adhesive 12 coupled to the backside of the base 14. The adhesive 12 can face inward away from the base in a direction towards the television 8. As well, it should be appreciated that the adhesive 12 can adhesively couple the mounting system 2 to a structure, such as the television 8, a wall 6, and the like. The wall 6 can be part of the television 8 or the wall 6 can be separate from the television 8, such as a wall of a building.

Figure 7:
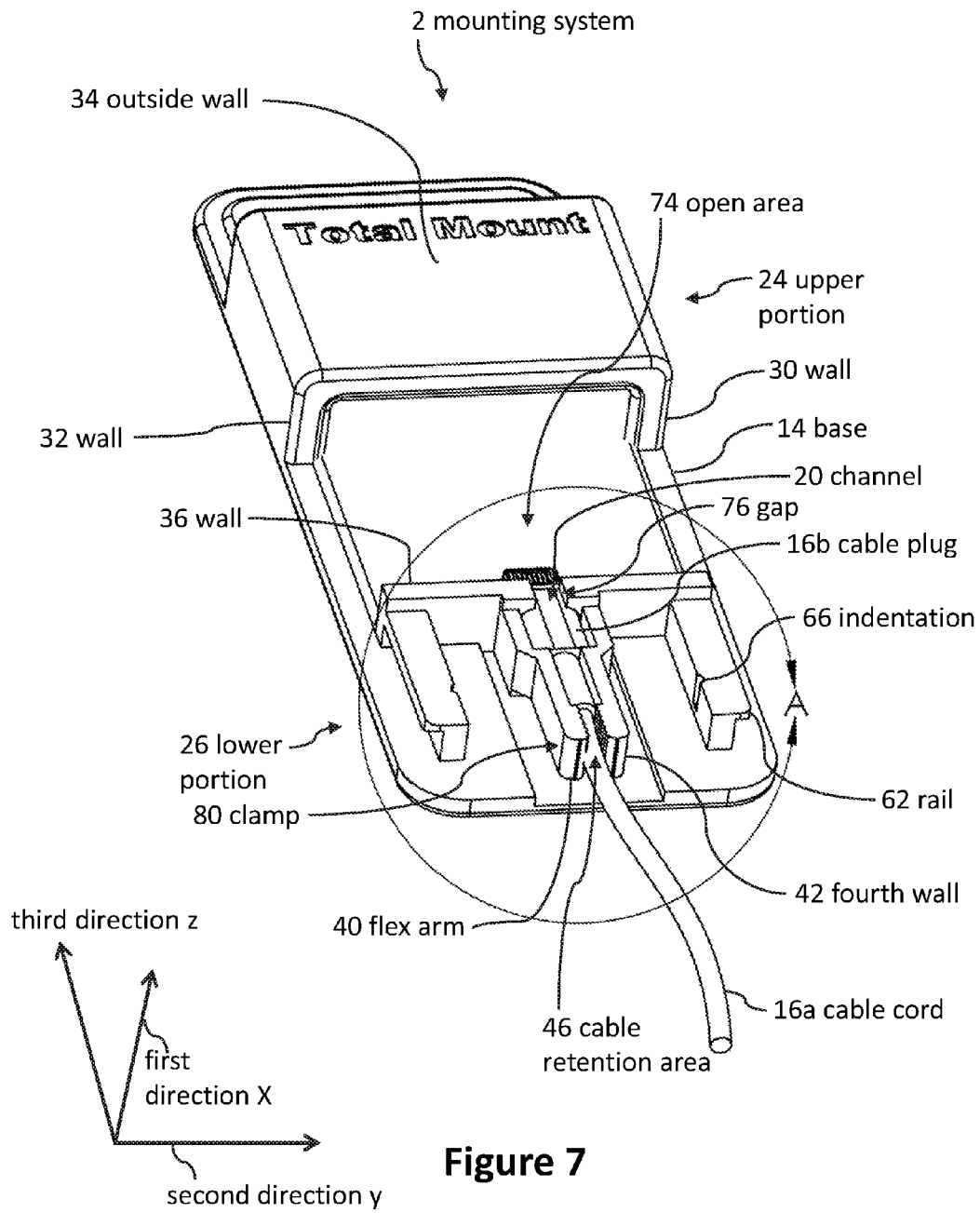
FIG. 7 illustrates a bottom perspective view of an embodiment of a mounting system, according to some embodiments.

As shown in FIG. 7, the mounting system 2 can include a first wall 30 and a second wall 32 that are coupled to an upper portion 24 of the base 14. The first and second walls 30, 32 can protrude outward away from the base 14 to thereby create an inner portion that can receive the remote control 4 along the third direction Z. In some embodiments, the base 14 includes a first sidewall and a second sidewall configured to wrap at least partially around the remote control 4. As such, the mounting system 2 can be configured to hold at least a portion of the remote control 4 between the first and second walls 30, 32 and/or the first and second sidewalls.

The mounting system 2 can further include an open area 74 located between the first and second walls 30, 32 and the third wall 36. The open area 74 can enable a user to see a distal portion of the cable plug 16b to facilitate guiding a receptacle 96 (e.g., an electrical port) of the remote control 4 to mate with the cable plug 16b (e.g. cable connector). Accordingly, the open area 74 may allow the user to more easily electrically couple the cable plug 16b to the remote control 4 to thereby aid the user in docking, or coupling, the remote control 4 to the mounting system 2.

In some embodiments, the mounting system 2 is configured to receive a cable 16, such as cable to recharge the remote control 4. In this regard, the mounting system 2 can be configured such that when the remote control 4 is held between the first and second walls 30, 32, the remote control thereby electrically couples with the cable 16 to recharge the remote control 4. To accomplish securing the cable 16 in place relative to the base 14, the mounting system 2 can include a channel 20 coupled to a lower portion 26 of the base 14. The channel 20 can be configured to hold a cable plug 16b such that a cable cord 16a exits the lower portion 26 of the base 14.

In some embodiments, the mounting system 2 further includes an outer wall 34 that couples the first wall 30 to the second wall 32. In this regard, the first and second walls 30, 32 can couple the outer wall 34 to the base 14. The outer wall 34 can securely retain the remote control 4 in place relative to the base 14 along the first direction X. As well, the first and second walls 30, 32 can securely retain the remote control 4 in place relative to the base 14 along the second direction Y. In this regard, the first and second walls 30, 32 and the outer wall 34 can be configured to slideably receive the remote control 4 along the third direction Z, but then fix the remote control 4 with respect to the first direction X and the second direction Y.

Figure 6:
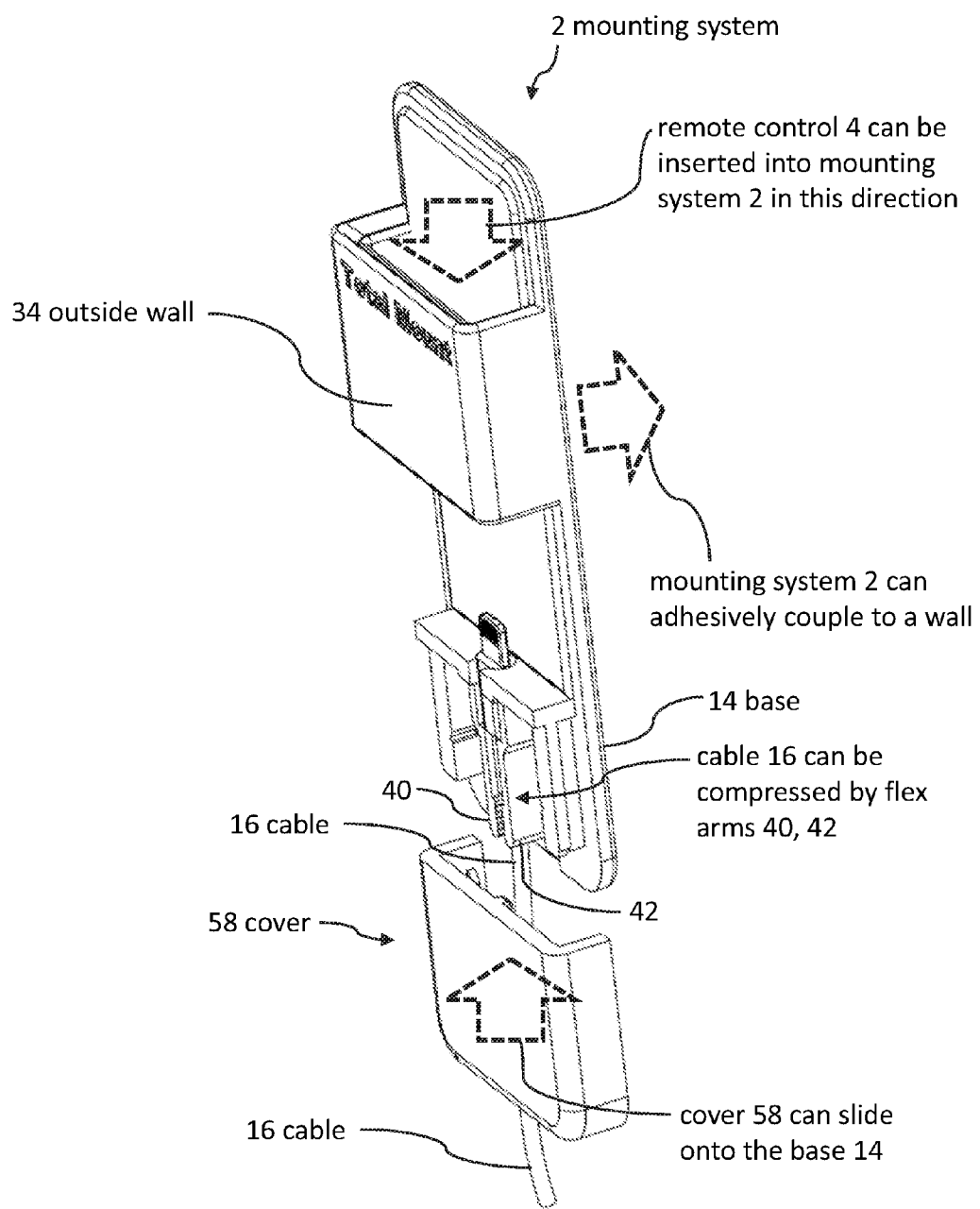
FIG. 6 illustrates a right side view of an embodiment of a mounting system, according to some embodiments.

The perimeter formed by the outer wall 34, the first wall 30, the second wall 32, and the base 14 is configured to wrap around a portion of the remote control 4. In some embodiments, the perimeter is formed by a softer material 90 than a first material 92 used to form the base 14. In some embodiments, the first material 92 can comprise acrylonitrile butadiene styrene ("ABS") or polypropylene ("PP"), and the softer material 90 can comprise overmolded thermoplastic elastomer ("TPE") or thermoplastic polyurethane ("TPU"). As well, in some embodiments, the outer wall 34 can include a trade name of the product, such as "TotalMount" as shown in FIGS. 6 and 7.

As further shown in FIG. 7, some embodiments may also include a third wall 36 that protrudes outward from the base 14. The third wall 36 can separate the upper portion 24 from the lower portion 26. In some embodiments, when the remote control 4 is coupled to the mounting system 2, the remote control 4 can rest against the third wall 36. In this regard, the remote control 4 is located above the third wall 36. The third wall 36 can thereby prevent the remote control 4 from moving farther downward relative to the base 14. In some embodiments, the third wall 36 is oriented within ten degrees of perpendicular relative to the first wall 30 and the second wall 32.

The third wall 36 can include a channel 20 that passes through at least a portion of the third wall 36. The channel 20 can be located below the third wall 36 such that the base 14 extends farther downward relative to the television 8 than the remote control 4. In some embodiments, the channel 20 faces upwards and includes a notch 76 (e.g., a gap) configured to enable placing the cable cord 16a and/or the cable plug 16b inside the channel 20. The notch 76 can be configured to secure (i.e. fix) the cable cord 16a and/or the cable plug 16b in place relative to the base 14.

In order to further secure the cable 16 to the mounting system 2, embodiments can include additional features that couple a portion of the cable 16 distal to the cable plug 16b, such as the cable cord 16a, to the base 14. For example, as shown in FIG. 7, some embodiments of the mounting system 2 include a first flex arm 40 and a fourth wall 42 coupled to the channel 20. The first flex arm 40 can protrude downward away from the first wall 30 and the second wall 32. As well, the first flex arm 40 and the fourth wall 42 can protrude downward away from the channel 20 to form a cable retention area 46.

In some embodiments, the cable retention area 46 is located between the first flex arm 40 and the fourth wall 42. The first flex arm 40 can be configured to move, or bend, towards the fourth wall 42 to compress the cable cord 16a to thereby impede the cable cord 16a from moving relative to the base 14. In some embodiments, the fourth wall 42 comprises a second flex arm that can be configured to move, or bend, towards the first flex arm 40. Even still, in some embodiments, the first flex arm 40 and/or the fourth wall 42 are coupled to the base 14 and the first flex arm 40 and/or the fourth wall 42 can extend away from the first and second sidewalls. As well, in some embodiments, the cable retention area 46 can be aligned with a central axis of the channel 20.

The first flex arm 40 and/or the fourth wall 42 can include retention ridges 48 to further assist in gripping the cable cord 16a to thereby assist in coupling the cable 16 to the base 14. In some embodiments, a distal portion of the first flex arm 40 comprises a first plurality of cable retention ridges 48 that protrude towards the fourth wall 42. Even still, in some embodiments, a distal portion of the fourth wall 42 comprises a second plurality of cable retention ridges 48 that protrude towards the first flex arm 40. The cable retention ridges 48 can be elongate along a first direction X that extends substantially perpendicular to the base 14. As well, the cable retention ridges 48 can protrude along a second direction Y that is substantially perpendicular to the first direction X.

Furthermore, in some embodiments, the mounting system 2 includes a clamp 80 that compresses the cable cord 16a within an interior portion of the mounting system 2. The clamp 80 can be coupled to the lower portion 26 of the base 14 such that the channel 20 orients the cable cord 16a downward relative to the television 8. The clamp 80 can be configured to substantially match the profile of the cable 16. For example, the clamp 80 can be configured to substantially match the shape of the intersection between the cable plug 16b and the cable cord 16a. In this regard, if downward force (along the third direction Z) is applied to the cable 16, then the clamp 80 can thereby retain the cable 16 in place relative to the base 14. As well, it should be appreciated that the clamp 80 can include any of the features previously described, such as cable retention ridges 48, and the like.

Figure 10:
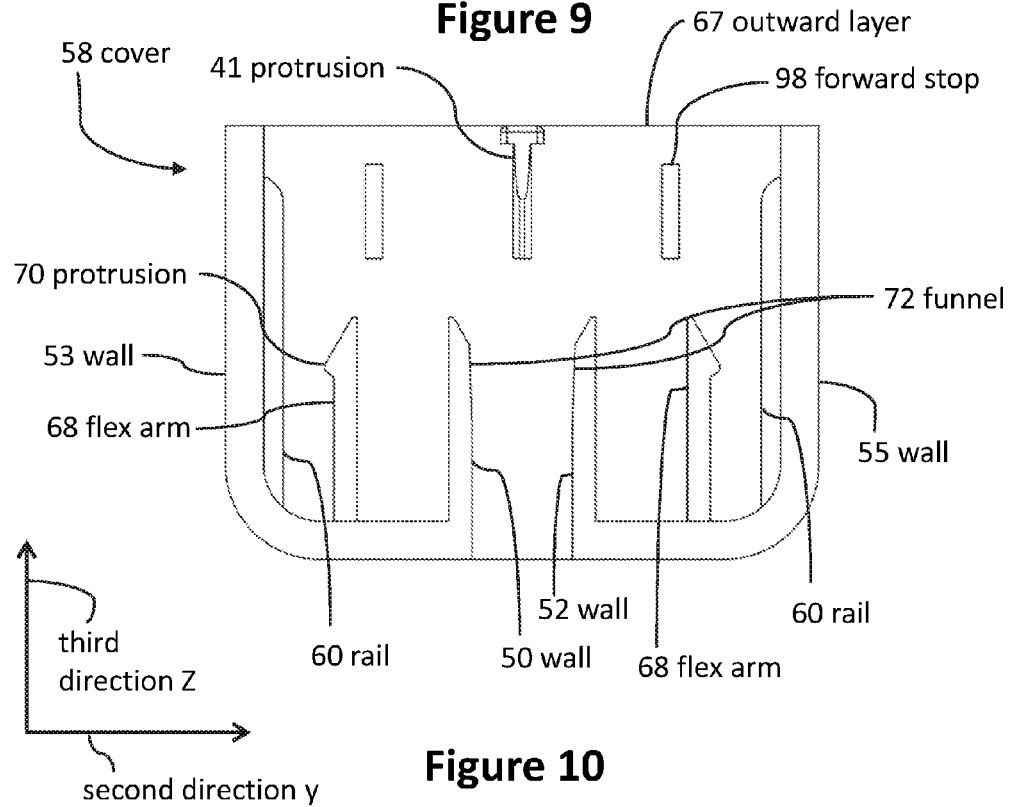
FIG. 10 illustrates a front view of an embodiment of a cover, according to some embodiments.
Figure 12:
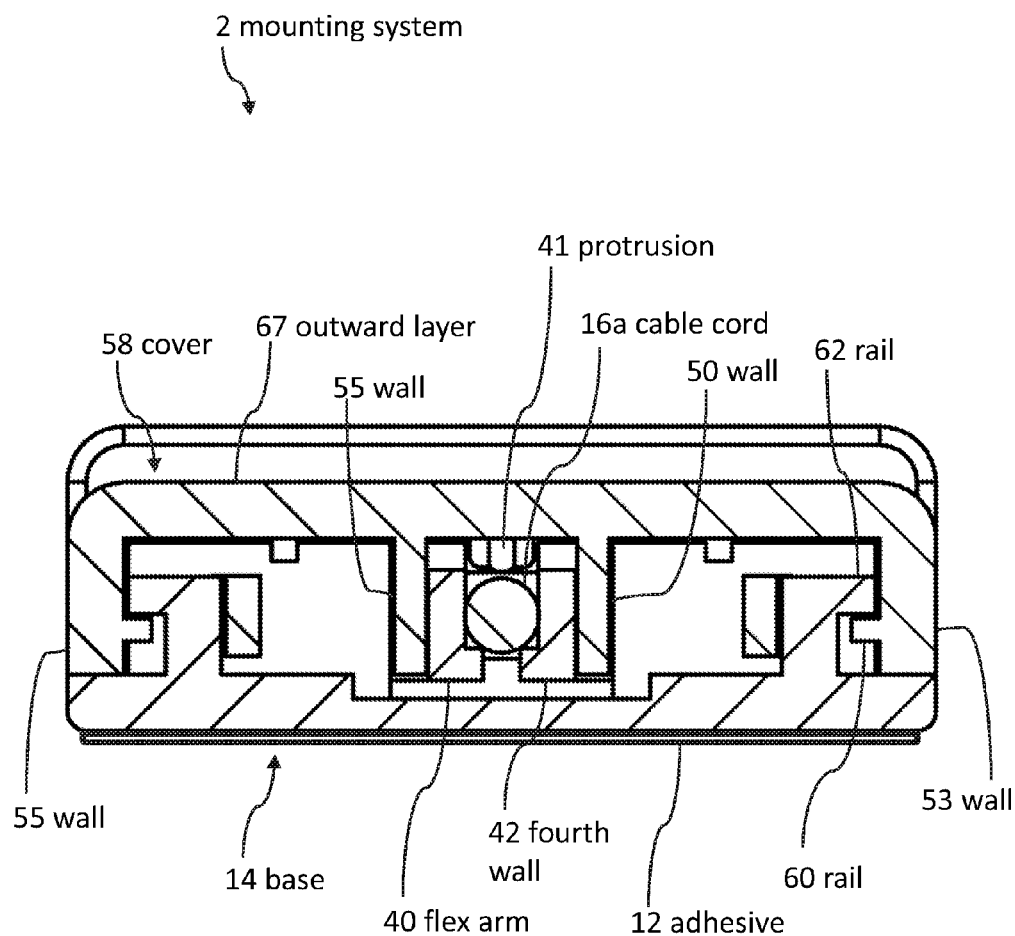
FIG. 12 illustrates a cross-sectional view along line F-F from FIG. 11, according to some embodiments.
Figure 12:
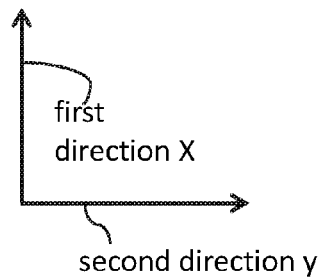

As shown in FIGS. 6, 10 and 12, the mounting system 2 can include a cover 58 that can be slideably coupled to the base 14 to thereby enclose a distal portion of the cable 16.

The cover 58 can slide towards the first wall 30 and the second wall 32 to mate with the base 14, as well the cover 58 can press the first flex arm 40 towards a first barrier, such as the fourth wall 42 or a second flex arm. In this regard, the cover 58 can compress the cable 16 in place relative to the base 14 and/or cover 58.

When the cover 58 is slideably coupled to the base 14, portions of the cover 58 (such as a fifth wall 50 and a sixth wall 52 or a second barrier and a third barrier) can engage the corresponding first flex arm 40 and fourth wall 42 (such as a first barrier) of the base 14. In doing so, the fifth wall 50 and the sixth wall 52 can force the first flex arm 40 and the fourth wall 42 to move toward each other to compress the cable cord 16a and thereby secure the cable 16 in place. As such, the fifth wall 50 and the sixth wall 52 of the cover 58 can be movable relative to the first flex arm 40 and the fourth wall 42 of the base 14.

In some embodiments, the first flex arm 40 and the fourth wall 42 are located at least partially between the fifth wall 50 and the sixth wall 52 such that moving the fifth wall 50 and the sixth wall 52 until the cable retention area 46 is located between the fifth wall 50 and the sixth wall 52 compresses the cable 16 by moving the first flex arm 40 towards the fourth wall 42. As such, when the cover 58 slides upwards towards the third wall 36 to mate with the base 14 the fifth and sixth walls 50, 52 can press the first flex arm 40 towards the fourth wall 42 to compress the cable cord 16a. In this regard, the cover 58 can enclose at least a portion of the cable 16, such as the portion of the cable 16 that is compressed by the fifth and sixth walls 50, 52.

In order to more easily compress the first flex arm 40 and the fourth wall 42, a first portion of the fifth wall 50 and a second portion of the sixth wall 52 can form a funnel 72 having a wide end and a narrow end. The wide end can be located closer to the third wall 36 than the narrow end such that the funnel is configured to facilitate compressing the first flex arm 40 towards the fourth wall 42. In this regard, the funnel 72 can create a mechanical advantage to thereby move the first flex arm 40 towards the fourth wall 42. As such, a first portion of the second barrier and a second portion of the third barrier can form the funnel 72 to facilitate compressing the first flex arm 40 towards the first barrier 42.

Figure 11:
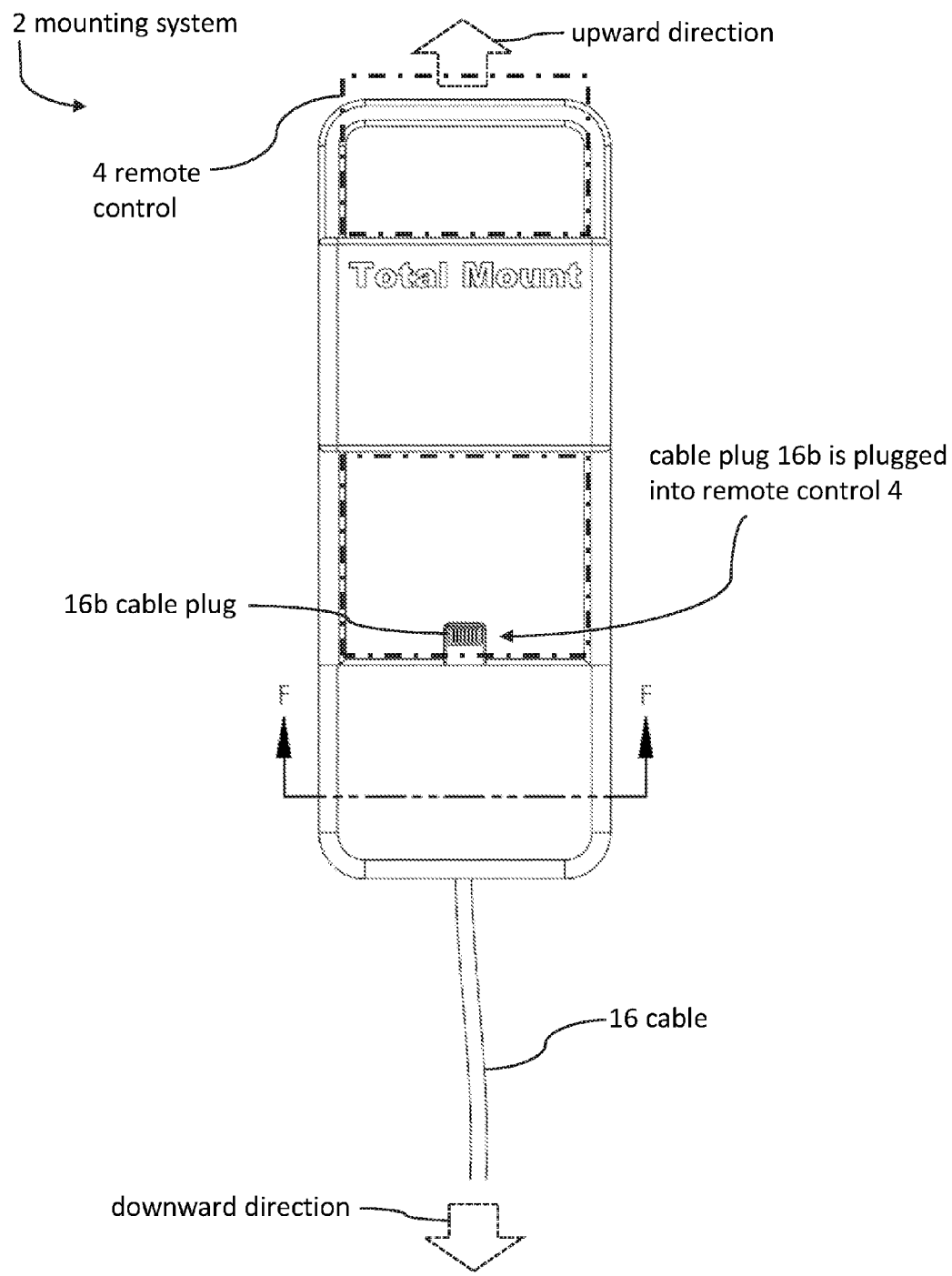
FIG. 11 illustrates a front view of an embodiment of a mounting system with a cable coupled to the mounting system, according to some embodiments.

Referring now to FIG. 11, the remote control 4 is inserted into the mounting system 2 in a downward direction. The remote control 4 can be removed from the mounting system 2 in an upward direction (that is opposite the downward direction). Thus, as used herein, "upward" and "downward" are defined based on how the remote control 4 is inserted into the mounting system 2 and removed from the mounting system 2.

As further shown in FIG. 12, the cover 58 can include a first rail 60 that couples with a second rail 62 of the base 14 to secure the cover 58 to the base 14. In this regard, the interaction between the first rail 60 and the second rail 62 can secure the cover 58 in place relative to the base 14 along the first direction X. Furthermore, in order to secure the cover 58 in place relative to the base 14 along the second direction Y and/or the third direction Z, the cover 58 can further include a third flex arm 68 having a protrusion 70 that mates with an indentation 66 of the second rail 62 to secure the cover 58 to the base 14. As well, to further secure the cover 58 in place relative to the second direction Y and/or the third direction Z, portions of the cover 58 can mate with portions of the third wall 36, such as a lower portion of the third wall 36.

Figure 9:
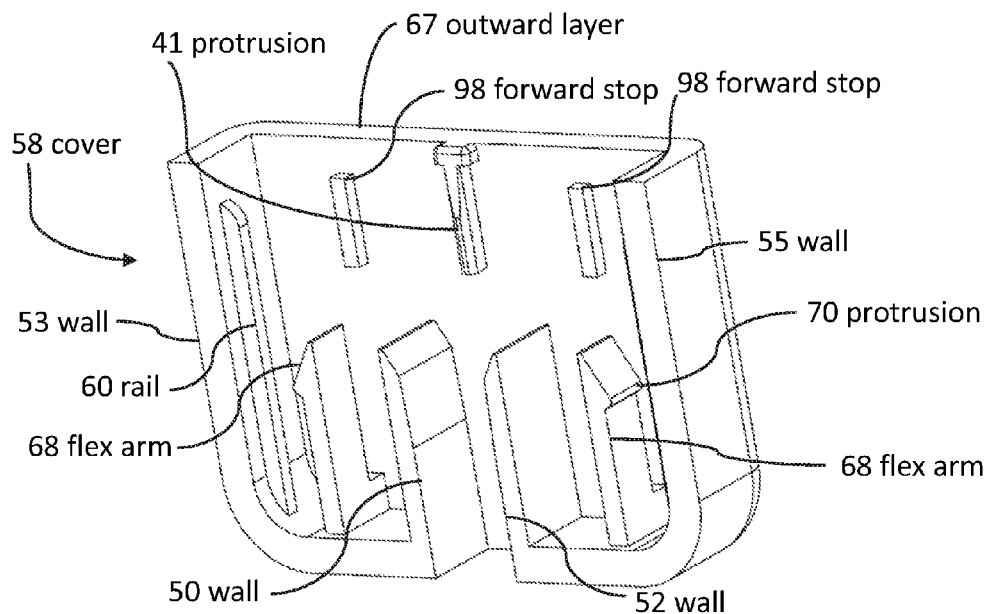
FIG. 9 illustrates a right side perspective view of an embodiment of a cover, according to some embodiments.

The cover 58 can also include structural features to secure the cable plug 16b in place relative to the cover 58 and/or the base 14. As shown in FIGS. 9 and 10, in some embodiments a top portion of the cover 58 comprises a protrusion 41 configured to mate with the cable plug 16b to secure the cable plug 16b in place relative to the cover 58. The protrusion 41 can extend away from the cover 58 such that when the cover 58 is slideably received by the base 14, the protrusion 41 can abut the cable plug 16b to secure the cable plug 16b in place. As shown in FIG. 9, the protrusion 41 can include a ramp that allows the cable plug 16b to securely slide into place between the protrusion 41 and the cover 58. The protrusion 41 can comprise a vertical extending portion that extends along the third direction Z. As well, the protrusion 41 can include a horizontal extending portion that extends along the second direction Y. As such, the vertical and horizontal extending portions can thereby define a t-shape, such as shown in FIGS. 9 and 10. Generally, the protrusion 41 can define any shape configured to lock the cable plug 16b in place relative to the cover 58 and the base 14.

As shown in FIGS. 9 and 10, the cover 58 can also include one or more forward stops 98, which can stop the cover 58 from moving too far forward with respect to the base 14. In some embodiments, the one or more forward stops 98 are disposed along each side of the protrusion 41.

Figure 3:
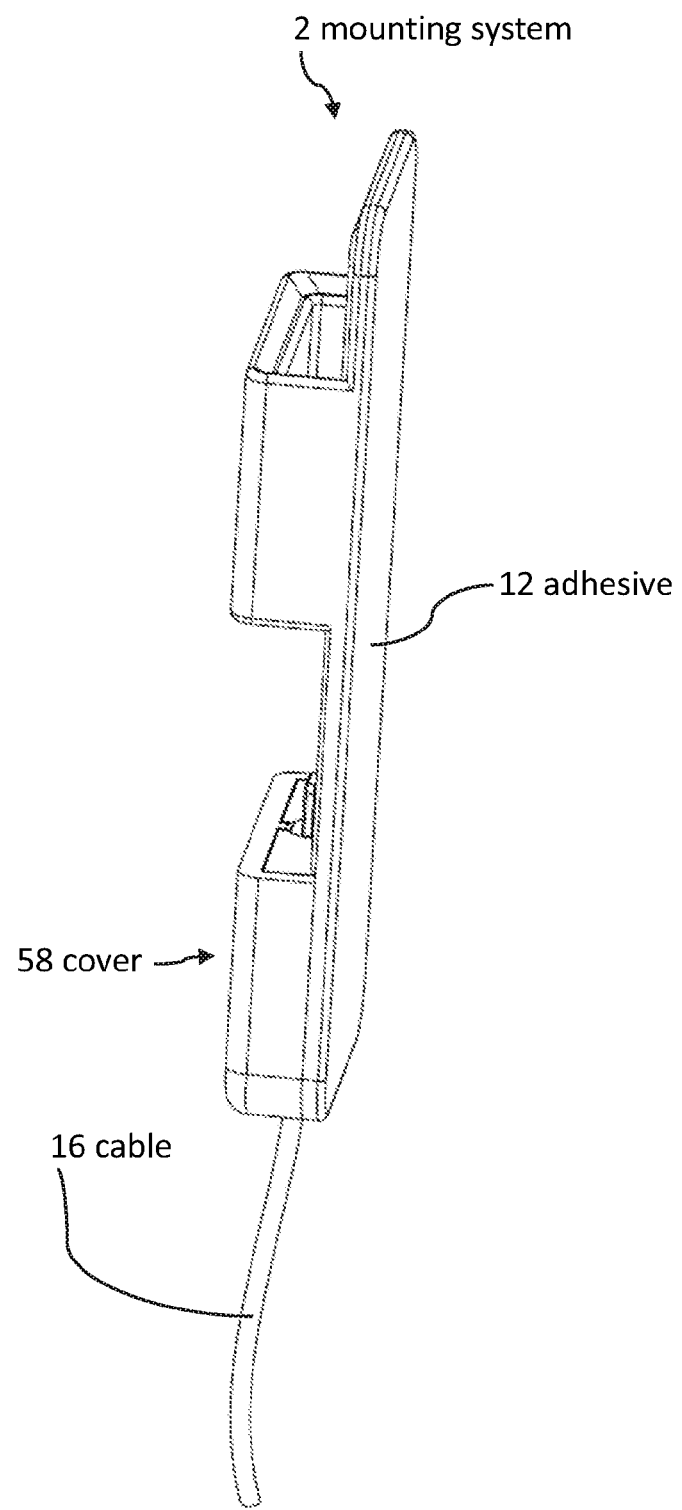
FIG. 3 illustrates a right side perspective view of an embodiment of a mounting system, according to some embodiments.
Figure 4:
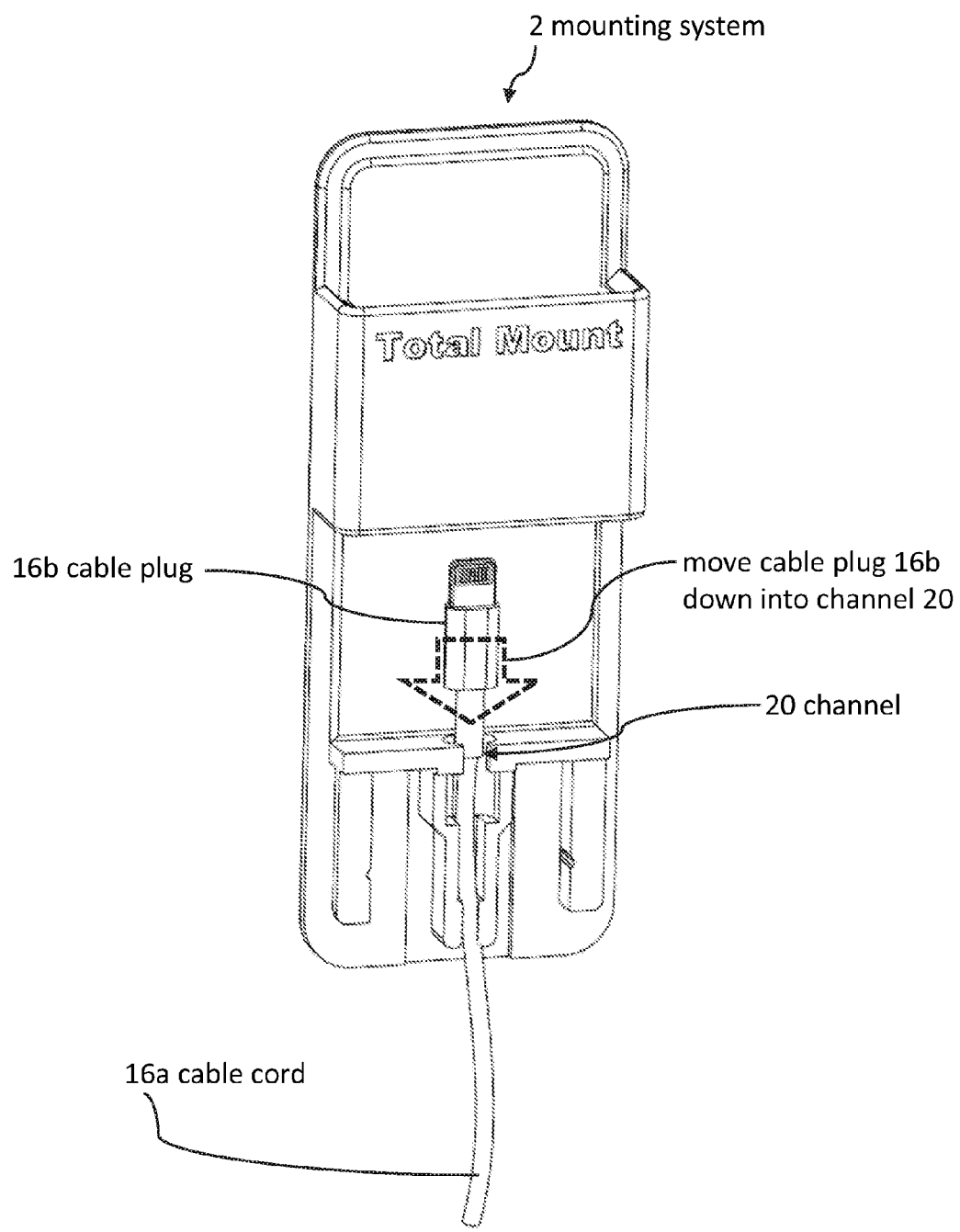
FIG. 4 illustrates a front view of an embodiment of a mounting system with a cable being coupled to the mounting system, according to some embodiments.
Figure 5:
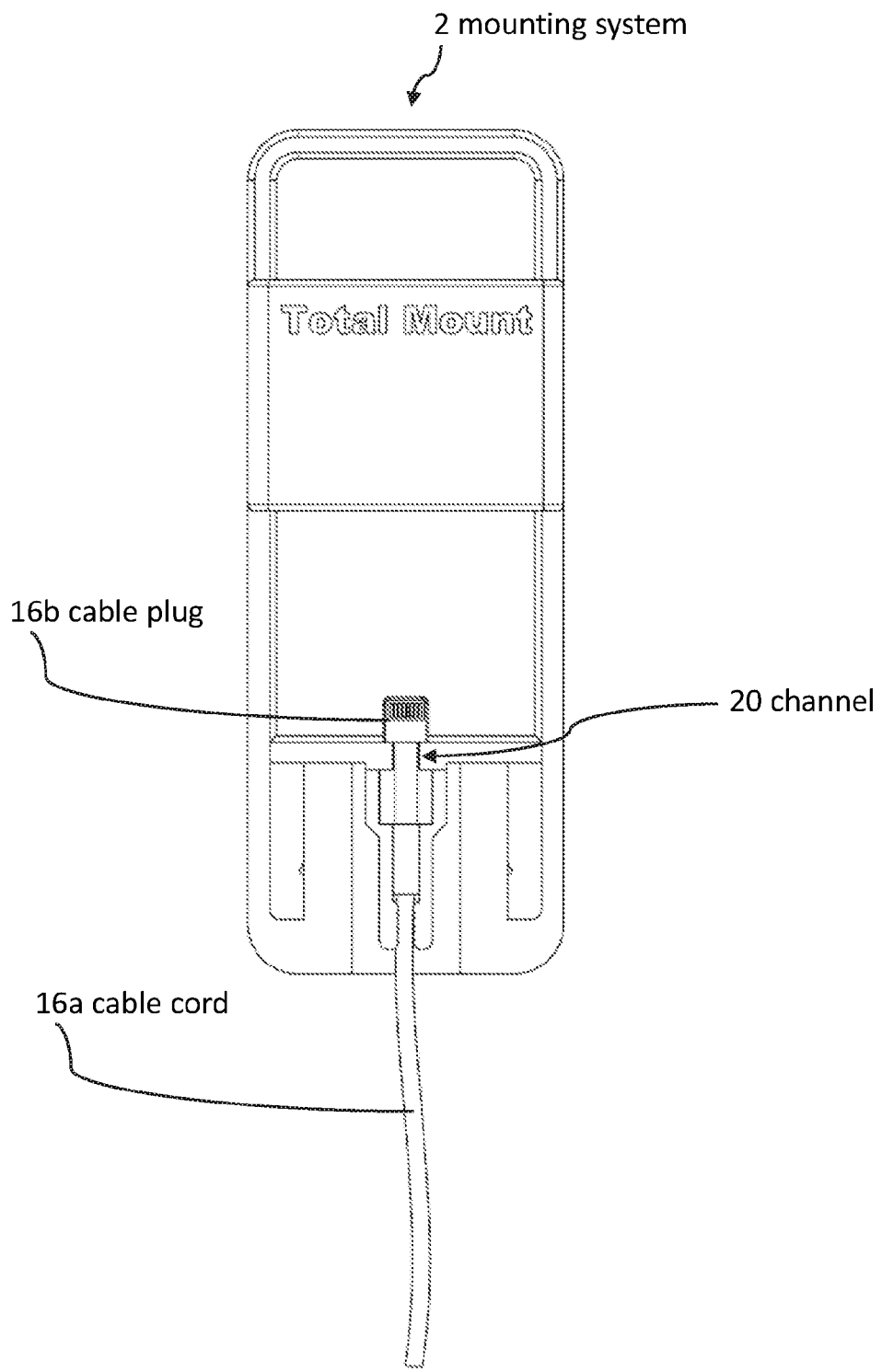
FIG. 5 illustrates a front view of an embodiment of a mounting system with a cable coupled to the mounting system, according to some embodiments.

As shown in FIGS. 1 and 3, the adhesive 12 can be configured to couple the mounting system 2 to a mounting surface (e.g., a wall 6 of a television, of furniture, are of any other suitable item). Referring now to FIGS. 7 and 12, the mounting system 2 can include a clamp 80 configured to compress the cable cord 16a within an interior portion of the mounting system 2. The clamp 80 is coupled to at least one of the third wall 36 and the lower portion 26 of the base 14.

Figure 8:
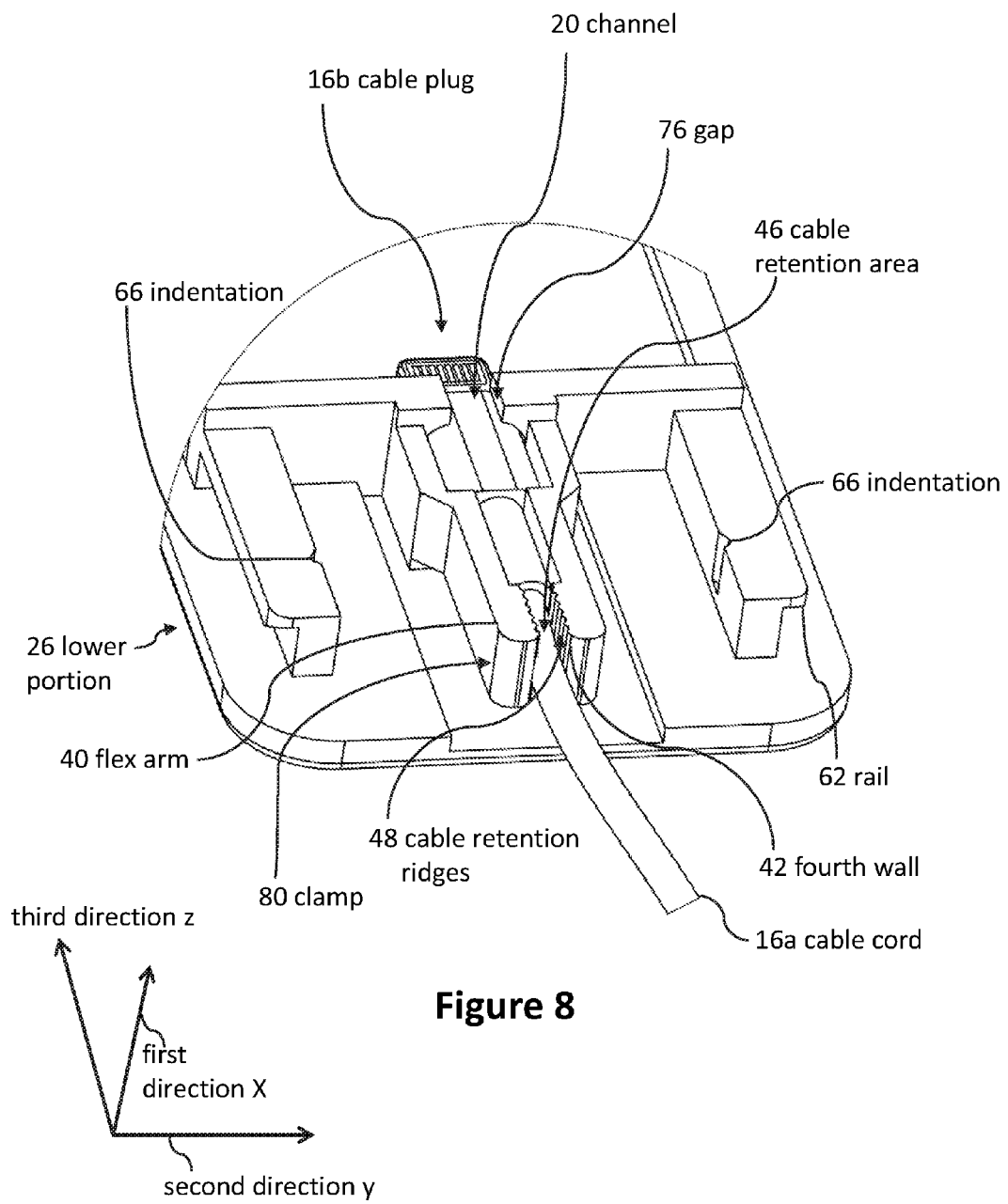
FIG. 8 illustrates a perspective view of area A from FIG. 7, according to some embodiments.

The mounting system 2 can include a cover 58 coupled to the lower portion 26 of the base 14. Referring now to FIGS. 9, 10, and 12, the cover 58 can comprise a fourth sidewall 53, a fifth sidewall 55, a sixth sidewall 50, and a seventh sidewall 52 that protrude inward towards the base 14 and are oriented within 15 degrees of being parallel to each other. The sixth sidewall 50 and the seventh sidewall 52 are located at least partially between the fourth sidewall 53 and the fifth sidewall 55. The sixth sidewall 50 and the seventh sidewall 52 compress a first portion 40 of the clamp 80 (labeled in FIG. 8) towards a second portion 42 of the clamp 80 to compress the cable cord 16a.

FIGS. 9 and 10 illustrate an open-faced cover 58. The cover 58 is open faced because the cover has an outward layer 67 but does not have an inward layer. For example, an inward layer would hide all the internal features (such as the flex arm 68, wall 50, wall 52, funnel 72, and protrusion 41) in the view shown in FIG. 10.

In some embodiments, the open-face design of the cover 58 is important to ensure the internal features of the cover 58 have access to corresponding features of the base 14 as shown in FIG. 12. For example, the rail 60 of the cover 58 couples with the rail 62 of the base 14. The walls 50, 52 of the cover 58 press the flex arm 40 (of the base 14) towards the fourth wall 42 (of the base 14). The fourth wall 42 can be a portion of another flex arm.

As shown in FIG. 12, the fourth sidewall 53 and the fifth sidewall 55 couple the cover 58 to the lower portion of the base 14. Referring now to FIGS. 9, 10, and 12, an inward facing side of the cover 58 is open faced to facilitate coupling internal elements of the cover 58 with corresponding elements of the lower portion of the base 14.

As previously described, the mounting system 2 can be coupled to a wall 6, such as a backside surface of a television 8. As such, the mounting system 2 can include attachment features including, but not limited to, adhesive 12, screw holes through the base 14 such that screws can threadably pass to anchor the mounting system 2 to the wall 6, and the like. With regards to adhesive, embodiments can include adhesive 12 that couples the base 14 to a backside of the television 8. In some embodiments, a first portion of the adhesive 12 is located between the channel 20 and the television 8. The adhesive 12 can be located on an opposite side relative to the first sidewall and the second sidewall. As such, the adhesive 12 can couple the mounting system 2 to the wall 6 while the base 14 holds the remote control 4.

When the base 14 is coupled to the television 8, the channel 20 can couple the cable plug 16b to the lower portion 26 of the base 14. In some embodiments, the channel 20 is coupled to the lower portion 26 of the base 14 such that a majority of the adhesive 12 coupled to the backside of the base 14 is located higher than the channel 20 such that pressing the remote control 4 onto the cable plug 16b places at least 60 percent of the adhesive in vertical tension rather than in vertical compression. The tension and compression are measured vertically relative to the base 14 rather than including a sum of three dimensional tension and compression.

Now with reference to FIGS. 16-20, in some embodiments, it is helpful for the mounting system 2 to guide the remote control 4 towards the cable 16 such that the receptacle 96 (e.g., an electrical port) of the remote control 4 mates with the end of the cable 16 with minimal effort of the user. A challenge is that the receptacle 96 of some remote controls is a different distance from the back of the remote control 4 than from the front of the remote control 4. As a result, designing the mounting system 2 to align the remote control's receptacle 96 can be quite difficult.

For example, users can place the remote control in the mounting system 2 with the buttons facing outward or inward. A design can be optimized such that the remote control's receptacle 96 mates with the end of the cable 16 when a user inserts the remote control 4 into the mounting system 2 with the buttons facing outward, such as away from the television 8 along the first direction X. This optimized design can be incompatible with the same remote control when the remote control is placed into the mounting system 2 with the buttons facing inward, such as towards the television 8 along the first direction X. This optimized design can prevent the remote's receptacle 96 from mating with the end of the cable 16 (when the remote's buttons face inward rather than outward). This incompatibility is caused by the distance from the remote's receptacle 96 to the front of the remote control 4 being different than the distance from the remote's receptacle 96 to the back of the remote 4.

Figure 16:
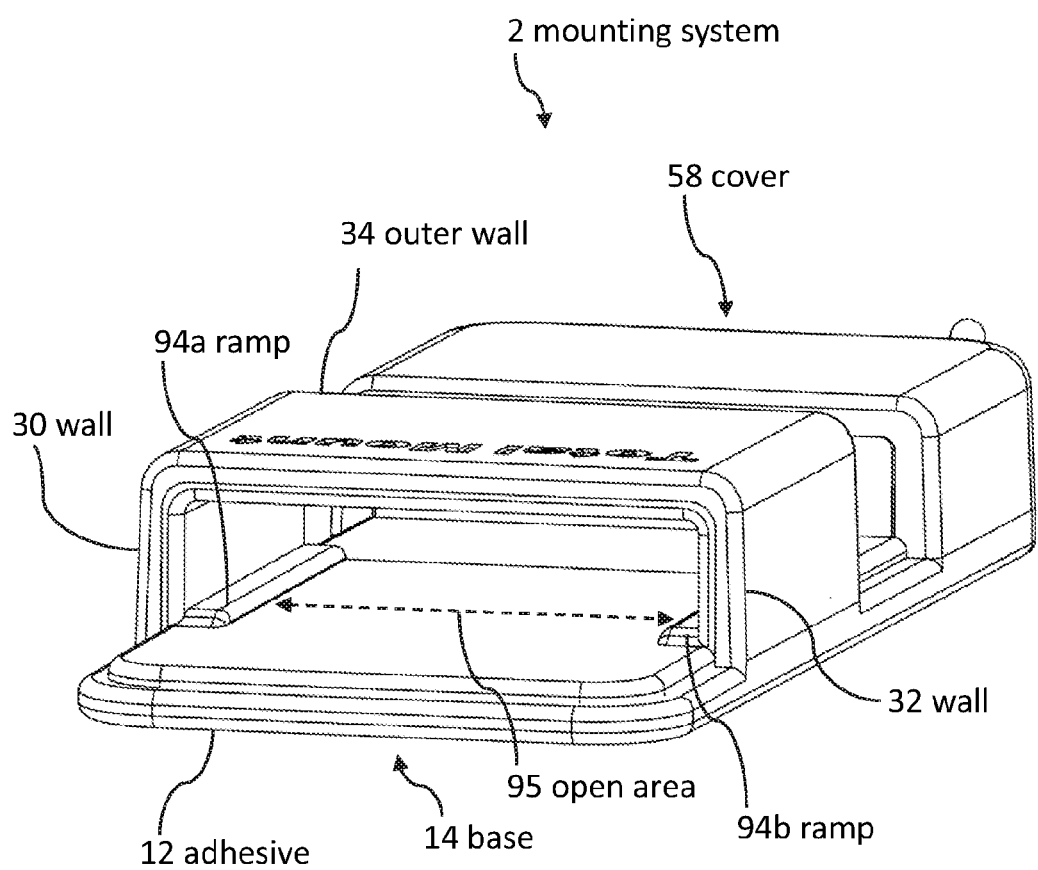
FIG. 16 illustrates a top perspective view of an embodiment of a mounting system, according to some embodiments.
Figure 18:
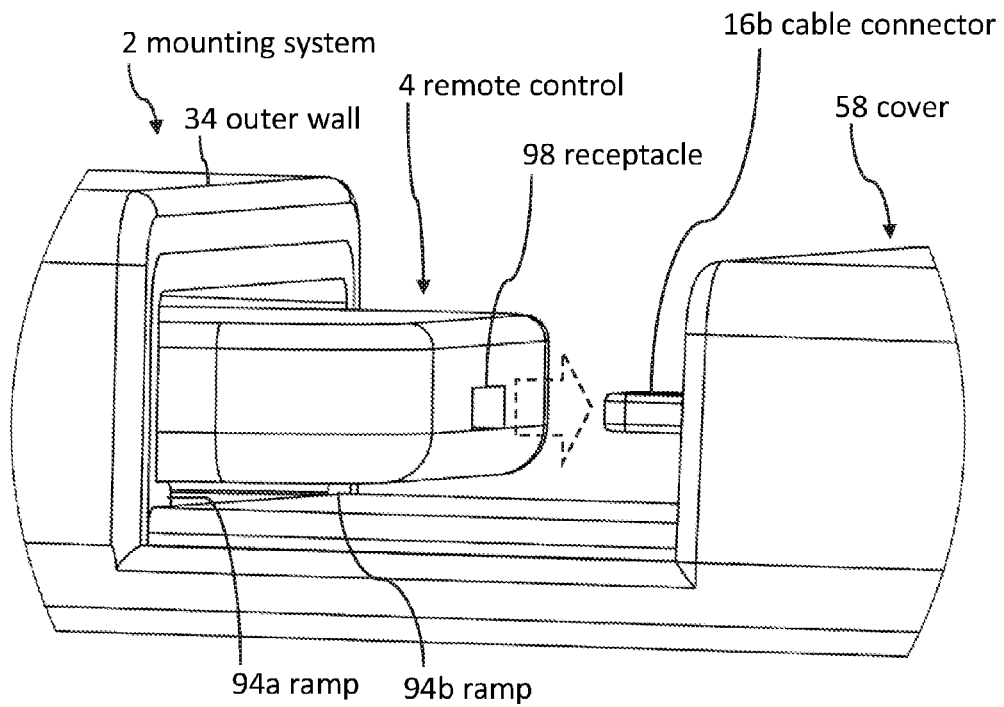
FIG. 18 illustrates a left side perspective view of area B from FIG. 17, according to some embodiments.
Figure 19:
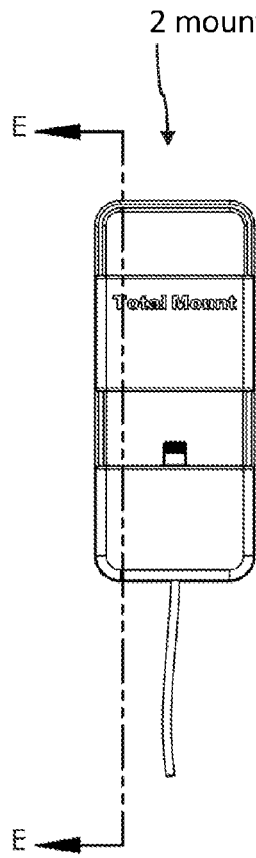
FIG. 19 illustrates a front view of an embodiment of a mounting system, according to some embodiments.

The ramps 94 shown in FIGS. 16 and 18 solve this problem by making the mounting system 2 compatible with the remote control 4 regardless of whether the remote 4 is inserted with the buttons facing outward or inward along the first direction X. The ramps 94 are located at an angle relative to the inward side of the base 14. In some embodiments, this angle is greater than zero degrees and less than 10 degrees. In some embodiments, the ramps 94 are oriented parallel to an outward side of the base 14.

The angle of the ramp 94 guides the remote control 4 towards the end of the cable 16. The angle of the ramp 94 can guide the receptacle 96 of the remote 4 towards the end of the cable 16.

A first ramp 94a and a second ramp 94b can protrude outward from the base 14 such that the ramp 94 is located farther outward than an area located between the ramps. The first and second ramps can be spaced apart from each other such that the buttons can fit between the ramps when the remote is inserted into the mounting system with the buttons facing inward. This feature also helps align the remote's receptacle 96 with the end of the cable (e.g., by reducing or eliminating the difference between a first distance from the remote's receptacle 96 to the front of the remote and a second distance from the remote's receptacle 96 to the back of the remote).

In some embodiments, the first ramp 94a is coupled to the first wall 30 coupled to a right portion of the base 14. The second ramp 94b can be coupled to the second wall 32 coupled to a left portion of the base 14.

In some embodiments, the ramps 94 have another advantage: The ramps 94 can terminate a first distance (e.g., at least 5 mm and less than 60 mm) from the third wall 36 and/or can terminate such that the ramps 94 do not continue through the open area 74. Terminating the ramps 94 allows the remote control 4 to "rock" (e.g., pivot) relative to the base 14. This pivoting motion helps the mounting system 2 accommodate large differences between a first distance from the remote's receptacle 96 to the front of the remote and a second distance from the remote's receptacle 96 to the back of the remote 4.

For example, in some embodiments when the remote control 4 is oriented parallel to the ramps 94 and touching the ramps 94, the ramps 94 may align the remote's receptacle 96 with an end of the cable 16 when the remote's buttons face outward, but might not align the remote's receptacle 96 with the end of the cable when the remote's buttons face inward (or vice versa). In this case, the remote control 4 can pivot on a lower end of the ramps 94 to align the remote's receptacle 96 with the end of the cable 16. Having the ramps 94 protrude farther outward than the outward side of the base 14 in the open area can enable the remote control 4 to pivot to electrically couple the remote control 4 to the cable 16.

Figure 17:
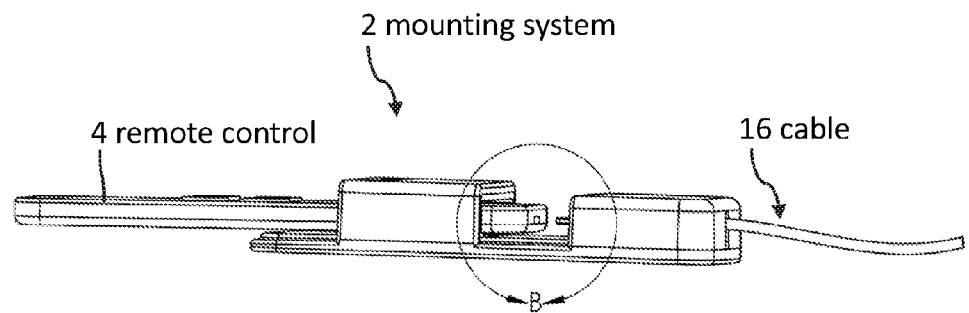
FIG. 17 illustrates a left side perspective view of an embodiment of a mounting system, according to some embodiments.

FIGS. 16-18 illustrate a first ramp 94a and a second ramp 94b located at least partially between the first wall 30 and the second wall 32. The first ramp 94a and the second ramp 94b protrude outward from the base 14 to form an open area 95 between the first ramp 94a and the second ramp 94b. The first ramp 94a and the second ramp 94b are oriented to help guide a receptacle 98 of the remote control 4 towards the cable plug (e.g., a cable connector 16b) as the remote control 4 is inserted into the mounting system 2.

Figure 20:
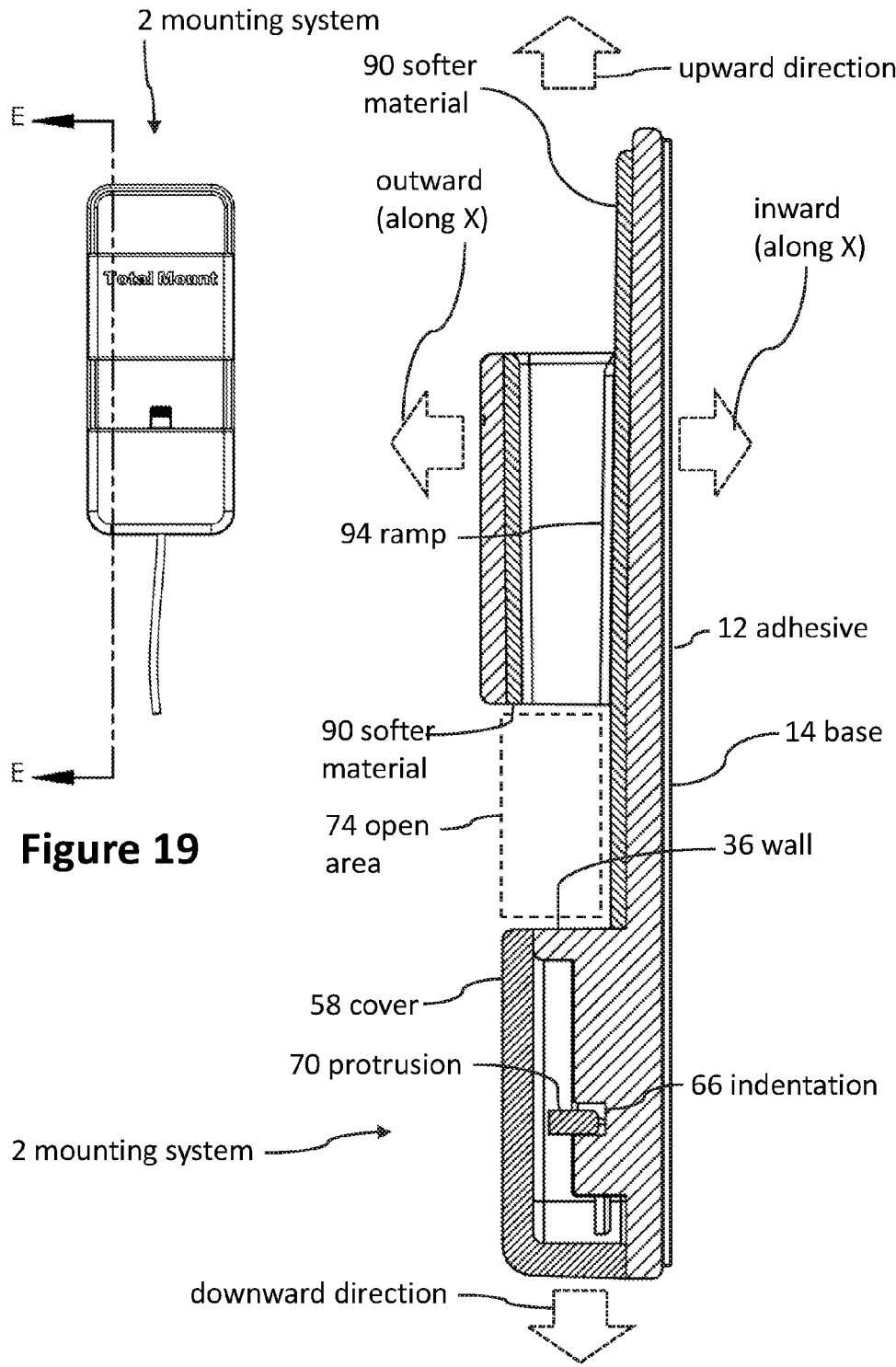
FIG. 20 illustrates a cross-sectional view along line E-E from FIG. 19, according to some embodiments.

Referring now to FIG. 20, the mounting system 2 include a base 14 having an inward side (along the X axis) and an outward side (along the X axis in a direction opposite relative to the inward direction). The inward side of the base 14 comprises adhesive 12, which can be less than 2.5 millimeters thick (along the X axis) in some embodiments. (In FIGS. 12 and 20, cross hatching of the adhesive 12 is not shown because the adhesive 12 is so thin that cross hatching would make FIGS. 12 and 20 less clear.) Referring now to FIGS. 16 and 20, the cover 58, wall 36, wall 30, and wall 32 are coupled to the outward side of the base 14.

In several embodiments, the cover 58 can be slid in a downward direction to decouple the cover 58 from the base 14. Referring now to FIG. 11, the remote control 2 can be removed (e.g., decoupled) from the mounting system 2 by moving the remote control 2 in an upward direction relative to the mounting system 2.

Referring now to FIGS. 4-7, some embodiments of coupling the remote control to the mounting system and/or to a wall include sliding the cover 58 downward relative to the base 14 to decouple the cover 58 from the base; moving the cable plug 16b downward into the channel 20 to position the cable cord 16a in the clamp 80 (e.g., to position the cable cord 16a between the flex arms 40, 42); sliding the cover 58 upward onto a lower portion of the base 14 to compress the clamp 80, which compresses a portion of the cable cord 16a located in the clamp 80; coupling, by the adhesive, the mounting system 2 to a wall; and/or inserting the remote control 4 in a downward direction through an area between walls 30, 32 (e.g., until the remote control is electrically coupled to the cable 16). These steps can be performed in any suitable order, including orders that are different from the order listed above.

FIG. 1 illustrates a cable mounting system 2b, which is more fully described in U.S. Provisional Patent Application No. 62/245,723; filed Oct. 23, 2015; and entitled MOUNTING SYSTEMS FOR ELECTRICAL CABLES; and in U.S. Design patent application No. 29/541,839; filed Oct. 8, 2015; and entitled CABLE HOLDER. U.S. Provisional Patent Application No. 62/245,723 and U.S. Design patent application No. 29/541,839 are incorporated by reference herein. (The cable mounting system 2b shown in FIG. 1 is often referred to as cable mounting system 2 in U.S. Provisional Patent Application No. 62/245,723.)

As shown in FIG. 1, the cable mounting system 2b can help guide the cable 16 from the mounting system 2 (that holds the remote control 4) to an electrical port 17 (e.g., a USB port) of the television 8. In some embodiments, the cable 16 is far longer than necessary to reach the electrical port 17. The cable mounting system 2b can prevent the excess cable length from hanging below the television 8, and thus, being unsightly visible to people watching the television 8.

As a result, the cable mounting system 2b can be beneficial to users of the mounting system 2. In some embodiments, a system (e.g., included in one retail package intended to be purchased by one end customer) includes the mounting system 2 and at least one cable mounting system 2b. The cable mounting system 2b can be designed for the cable 16 of the mounting system 2. In some embodiments, a system (e.g., included in one retail package intended to be purchased by one end customer) includes the mounting system 2 and a mount configured to hold a media player. For example, the mounting system 2 can hold the remote control of the media player while another mount holds the media plyer. The mount configured to hold a media player can be any of the embodiments described in U.S. Provisional Patent Application No. 62/252,652; filed Nov. 9, 2015; and entitled MOUNTING SYSTEMS AND KITS FOR DIGITAL MEDIA PLAYERS. U.S. Provisional Patent Application No. 62/252,652 is incorporated by reference herein.

Interpretation

As used herein, the term "susbtantially" can be interpretted to have different meanings depending upon the context. For example, "substantially" can mean two surfaces that are within 25 degrees of each other. As well, the term "substantially" can be understood to mean that two protrusions are aligned within 0.2 inches of one another along a defined direction. In other contexts, "substantially" can mean plus or minus 0.2 inches.

As well, the term "about" can be interpreted to mean different things depending upon the context. For example, if the disclosure states that a pad is "about" 0.045 inches thick. The term "about" can mean that the pad is within + or −0.005 inches. In another example, if the disclosure states that a thickness is "about" 0.5 inches thick. The term "about," within this context, can mean that the thickness is within + or −0.05 inches. In yet another example, if the disclosure states that a thickness is "about" 1 millimeter thick. The term "about," within this context, can mean that the thickness is within + or −0.1 millimeters.

"Electronic device" can comprise any electronic device, such as a streaming media player, gaming console, cable box (for bringing digital cable television content from a cable provider to a television), and the like. The term "wall" can comprise any surface located along a television, such as a backside surface of a television. "Wall" can also comprise any wall associated with a building (e.g. home, office building, school, etc.), such as an interior wall and an exterior wall.

"Securely coupled" can mean snugly fit or closely fit. In other words, "securely coupled" can mean that the inside space between the base and a top underside of the extension wall is slightly greater than the thickness (e.g. height) of the electronic device 11.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A mounting system configurable to couple a remote control to a television, the mounting system comprising:
   a base having a backside and a frontside, wherein an adhesive is coupled to the backside of the base and faces inward away from the base;

a channel coupled to a lower portion of the base and configured to hold a cable plug such that a cable cord exits the lower portion of the base;
a first flex arm and a fourth wall coupled to the lower portion such that a cable retention area is located between the first flex arm and the fourth wall; and
a fifth wall and a sixth wall that are movable relative to the first flex arm and the fourth wall, wherein the mounting system is configured such that moving the fifth and sixth walls until the cable retention area is located between the fifth and sixth walls compresses the cable cord by moving the first flex arm towards the fourth wall.

2. The mounting system of claim 1, further comprising a third wall that protrudes outward from the base and separates the lower portion from an upper portion of the base, wherein the channel passes through at least a portion of the third wall.

3. The mounting system of claim 2, further comprising a first wall and a second wall that are coupled to the upper portion of the base and protrude outward away from the base, wherein the mounting system is configured to hold at least a portion of the remote control between the first and second walls.

4. The mounting system of claim 3, wherein the third wall is oriented within ten degrees of perpendicular relative to the first wall and the second wall.

5. The mounting system of claim 1, wherein the cable retention area is aligned with a central axis of the channel, and the first flex arm protrudes away from an upper portion of the base.

6. The mounting system of claim 1, wherein the first flex arm and the fourth wall are located at least partially between the fifth wall.

7. The mounting system of claim 6, further comprising a second flex arm comprising the fourth wall, wherein the second flex arm is configured to bend towards the first flex arm.

8. The mounting system of claim 1, further comprising a cover having the fifth wall and the sixth wall, wherein the cover is slidably coupled to the base and is configured to press the first flex arm towards the fourth wall to compress the cable cord.

9. The mounting system of claim 8, wherein the cover comprises a first rail coupled to a second rail of the base to secure the cover to the base.

10. The mounting system of claim 9, wherein the cover comprises a third flex arm having a protrusion coupled to an indentation of the second rail to couple the cover to the base.

11. The mounting system of claim 8, wherein a first portion of the fifth wall and a second portion of the sixth wall form a funnel configured to facilitate compressing the first flex arm towards the fourth wall.

12. The mounting system of claim 8, wherein the channel comprises a gap configured to enable placing the cable cord inside the channel such that the cable plug can be inserted into the channel, wherein the cover comprises an inward protrusion located at least partially in the gap to help impede the cable plug from exiting the channel through the gap.

13. The mounting system of claim 1, wherein the first flex arm protrudes downward, a distal portion of the first flex arm comprises a first set of cable retention ridges configured to grip the cable cord, and the first set of ridges protrude towards the fourth wall.

14. The mounting system of claim 13, wherein the first set of ridges is oriented in a first direction that extends substantially perpendicular to the base, and wherein the first set of ridges protrude along a second direction that is substantially perpendicular to the first direction.

15. The mounting system of claim 13, wherein a distal portion of the fourth wall comprises a second set of cable retention ridges that protrudes towards the first flex arm, wherein the first and second sets of cable retention ridges are configured to deform a portion of the cable cord to impede the cable plug from moving.

16. The mounting system of claim 1, further comprising a cable having the cable cord and the cable plug, wherein the first flex arm is located on an opposite side of the base relative to the adhesive, the adhesive is configured to couple the base to the television, the mounting system is configured to hold the remote control such that at least a portion of the remote control is located between a first wall and a second wall that are coupled to an upper portion of the base, the first flex arm couples the cable cord to the base, the cable plug is located at least partially in the channel in an orientation configured to facilitate the cable plug being located at least partially inside a first electrical port of the remote control such that the system is configured to charge the remote control from a second electrical port of the television while the system couples the remote control to the television and to the cable cord configured to charge the remote control.

17. The mounting system of claim 16, further comprising an outer wall that couples the first wall to the second wall, wherein the first and second walls couple the outer wall to the base, wherein a perimeter is formed by the outer wall, the first wall, the second wall, and the base, and the perimeter is configured to wrap around the portion of the remote control, the mounting system further comprising a third wall that protrudes outward from the base and separates the upper portion from the lower portion of the base, wherein the channel passes through at least a portion of the third wall, the mounting system further comprising an open area between the outer wall and the third wall, wherein the open area is configured to enable a user to see a distal portion of the cable plug to facilitate guiding the distal portion of the cable plug into the first electrical port of the remote control.

18. The mounting system of claim 1, further comprising an outer wall that couples a first wall to a second wall, wherein the first and second walls couple the outer wall to the base, wherein an inner perimeter formed by at least inner portions of the outer wall, the first wall, the second wall, and the base and configured to wrap around a portion of the remote control is formed by a softer material than a first material used to form the base.

19. The mounting system of claim 1, wherein a central axis of the channel is oriented towards a region of the mounting system that is configured to hold the remote control, the channel comprises a gap configured to enable placing at least one of the cable cord and the cable plug inside the channel, and the first flex arm and the fourth wall are coupled to the channel and protrude away from the channel to form the cable retention area.

20. The mounting system of claim 1, wherein the adhesive is configured to couple the base to the television, and the channel is configured to couple the cable plug to the lower portion of the base.

21. The mounting system of claim 20, further comprising a clamp, wherein the clamp comprises the first flex arm and the fourth wall, wherein the clamp is configured to compress the cable cord within an interior portion of the mounting system, wherein the clamp is coupled to the lower portion of the base such that the channel is oriented in a direction configured to orient the cable cord downward relative to the base, and further comprising a cover configured to compress the clamp to compress the cable cord.

22. The mounting system of claim 20, further comprising a television and a cable cord, wherein the adhesive couples the base to the television, the channel is coupled to the lower portion such that a majority of the adhesive coupled to the backside of the base is located higher than the channel, and the cable cord is compressed between the first flex arm and the fourth wall due to at least one of the fifth and sixth walls pressing the first flex arm towards the fourth wall.

23. The mounting system of claim 20, further comprising a third wall that protrudes outward from the base and separates the lower portion from an upper portion of the base, wherein the channel passes through at least a portion of the third wall, the mounting system is configured to hold the remote control above the third wall, wherein the first flex arm, the fourth wall, and at least a majority of the channel are located below the third wall, and the third wall is configured to prevent the remote control from moving farther downward than the third wall.

24. The mounting system of claim 1, wherein the adhesive is configured to couple the mounting system to a mounting surface, the mounting system further comprising:
a clamp configured to compress the cable cord within an interior portion of the mounting system, wherein the clamp comprises the first flex arm and the fourth wall; and
a first ramp and a second ramp located at least partially between a first wall and a second wall that are coupled to the base and protrude outward away from the base, wherein the mounting system is configured to hold at least a portion of the remote control between the first and second walls,
wherein the first and second ramps protrude outward from the base to form an open area between the first and second ramps, and the first and second ramps are oriented such that the mounting system is configured to help guide a receptacle of the remote control towards the cable plug as the remote control is inserted into the mounting system.

25. The mounting system of claim 1, wherein the adhesive is configured to couple the mounting system to a mounting surface, the mounting system further comprising:
a clamp configured to compress the cable cord within an interior portion of the mounting system, wherein the clamp is coupled to the lower portion of the base, and the clamp comprises the first flex arm and the fourth wall; and
a cover movably coupled to the lower portion of the base, wherein the cover comprises the fifth wall, the sixth wall, a seventh sidewall, and an eighth sidewall that protrude inward towards the base and are oriented within 15 degrees of being parallel to each other, wherein the fifth and sixth walls are located at least partially between the seventh and eighth sidewalls, sixth and seventh sidewalls are located at least partially between the fourth and fifth sidewalls, and the fifth and sixth walls are configured to compress a first portion of the clamp towards a second portion of the clamp to compress the cable cord.

26. The mounting system of claim 25, wherein the seventh and eighth sidewalls couple the cover to the lower portion of the base, and an inward facing side of the cover is open faced to facilitate coupling internal elements of the cover with corresponding elements of the lower portion of the base.

27. A mounting system configurable to couple a remote control to a wall, the mounting system comprising:
a base having a first sidewall and a second sidewall configured to wrap at least partially around the remote control, wherein a first flex arm and a first barrier are coupled to the base;
an adhesive coupled to a backside of the base and configured to couple the base to the wall; and
a cover configured to press the first flex arm towards the first barrier to compress a cable of the remote control in response to coupling the cover to the base.

28. The mounting system of claim 27, further comprising a television, the wall, the cable, and the remote control, wherein the adhesive is located on an opposite side relative to the first sidewall and the second sidewall, the adhesive couples the mounting system to the wall, the mounting system holds the remote control, the first flex arm secures the cable such that the cable is coupled with the remote control, and the television is electrically coupled to the remote control via the cable such that the system is configured to recharge the remote control with electricity from the television.

29. The mounting system of claim 27, wherein the cover comprises a second barrier and a third barrier configured to compress the first flex arm towards the first barrier, the first barrier comprises a second flex arm, and a first portion of the second barrier and a second portion of the third barrier form a funnel configured to facilitate compressing the first flex arm towards the first barrier.

30. The mounting system of claim 27, further comprising a clamp, wherein the clamp comprises the first flex arm and the first barrier, wherein the cover is slidably coupled to the base such that the cover is configured to compress the clamp to compress the cable in response to sliding the cover towards the first and second sidewalls to couple the cover to the base.

* * * * *